United States Patent
Matsushima

(10) Patent No.: US 10,254,599 B2
(45) Date of Patent: Apr. 9, 2019

(54) LIQUID CRYSTAL DISPLAY DEVICE

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/388,418

(22) Filed: Dec. 22, 2016

(65) Prior Publication Data
US 2017/0102592 A1    Apr. 13, 2017

Related U.S. Application Data

(63) Continuation of application No. 14/708,924, filed on May 11, 2015, now Pat. No. 9,575,384.

(30) Foreign Application Priority Data

May 12, 2014 (JP) ................................. 2014-098531

(51) Int. Cl.
*G02F 1/1343* (2006.01)
*G02F 1/1335* (2006.01)
(Continued)

(52) U.S. Cl.
CPC ...... *G02F 1/134336* (2013.01); *G02F 1/1337* (2013.01); *G02F 1/133512* (2013.01);
(Continued)

(58) Field of Classification Search
CPC ................................................ G02F 1/134363
See application file for complete search history.

(56) References Cited

U.S. PATENT DOCUMENTS

| | | | |
|---|---|---|---|
| 6,147,731 A | 11/2000 | Shibahara | |
| 2007/0153202 A1* | 7/2007 | Kang | .............. G02F 1/13439 349/141 |

(Continued)

FOREIGN PATENT DOCUMENTS

| | | |
|---|---|---|
| CN | 102141706 A | 8/2011 |
| CN | 103713432 A | 4/2014 |

(Continued)

OTHER PUBLICATIONS

Chinese Office Action dated Jul. 26, 2016 in corresponding Chinese Patent Application No. 201510235996.9.

(Continued)

*Primary Examiner* — Sang V Nguyen
(74) *Attorney, Agent, or Firm* — K&L Gates LLP

(57) ABSTRACT

According to an aspect, a liquid crystal display device includes a first substrate, a second substrate, a liquid crystal layer, a first electrode, and a second electrode. The first electrode includes an electrode base portion extending in a first direction, and a plurality of comb tooth portions extending in a second direction different from the first direction and protruding from the electrode base portion with a certain distance interposed therebetween. At least one of the first substrate and the second substrate includes a light-blocking part that reduces intensity of light passing therethrough at a position overlapping with at least one of the center of the comb tooth portion and the center between the adjacent comb tooth portions in a direction perpendicular to the first substrate.

16 Claims, 18 Drawing Sheets

(51) Int. Cl.
  *G02F 1/1337* (2006.01)
  *G02F 1/1362* (2006.01)
  *G02F 1/1333* (2006.01)
  *G02F 1/1368* (2006.01)

(52) U.S. Cl.
  CPC .. *G02F 1/133707* (2013.01); *G02F 1/134363* (2013.01); *G02F 1/136209* (2013.01); *G02F 1/136286* (2013.01); *G02F 1/1368* (2013.01); *G02F 1/133345* (2013.01); *G02F 2001/133302* (2013.01); *G02F 2001/134345* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2008/0100787 A1 | 5/2008 | Segawa et al. | |
| 2008/0198318 A1* | 8/2008 | Lee | G02F 1/134363 349/141 |
| 2011/0187950 A1* | 8/2011 | Matsushima | G02F 1/133 349/33 |
| 2012/0162589 A1* | 6/2012 | Yoso | G02F 1/134363 349/126 |
| 2013/0100388 A1* | 4/2013 | Matsushima | G02F 1/134363 349/123 |
| 2013/0135572 A1* | 5/2013 | Park | G02F 1/134336 349/143 |
| 2014/0092353 A1* | 4/2014 | Matsushima | G02F 1/133512 349/110 |
| 2014/0118639 A1* | 5/2014 | Matsushima | G02F 1/13338 349/12 |
| 2014/0267958 A1* | 9/2014 | Sugita | G02B 27/2214 349/15 |
| 2014/0293175 A1* | 10/2014 | Tamaki | G02F 1/134363 349/33 |
| 2014/0293176 A1 | 10/2014 | Tamaki et al. | |
| 2014/0293177 A1* | 10/2014 | Matsushima | G02F 1/134363 349/33 |
| 2014/0307212 A1* | 10/2014 | Oka | G02F 1/134363 349/123 |
| 2014/0320791 A1 | 10/2014 | Oiwa et al. | |
| 2014/0354931 A1* | 12/2014 | Kurasawa | G02F 1/134336 349/124 |
| 2016/0299390 A1 | 10/2016 | Matsushima | |

FOREIGN PATENT DOCUMENTS

| | | |
|---|---|---|
| JP | 11-271810 | 10/1999 |
| JP | 2001-305564 | 10/2001 |
| JP | 2008-052161 A | 3/2008 |
| JP | 2008-116484 | 5/2008 |
| JP | 2009-116334 | 5/2009 |
| JP | 2011-158690 | 8/2011 |
| JP | 2013-109309 A | 6/2013 |
| JP | 2014-209212 A | 11/2014 |
| JP | 2014-209213 A | 11/2014 |

OTHER PUBLICATIONS

Second Office Action issued in connection with corresponding Chinese Patent Application No. 201510235996.9, dated Feb. 9, 2018 with English translation. (20 pages).

Japanese Office Action dated Aug. 22, 2017 in corresponding Japanese Application No. 2014-098531.

* cited by examiner

LIQUID CRYSTAL DISPLAY DEVICE

CROSS-REFERENCE TO RELATED APPLICATIONS

The present application is a continuation of U.S. application Ser. No. 14/708,924, filed May 11, 2016, which claims priority to Japanese Priority Patent Application 2014-098531, filed in the Japan Patent Office on May 12, 2014, the disclosures of which are hereby incorporated by reference herein.

BACKGROUND

1. Technical Field

The present invention relates to a liquid-crystal display device provided with liquid crystals and to an electronic apparatus including the liquid-crystal display device provided with liquid crystals.

2. Description of the Related Art

There have been developed systems (modes) for driving liquid crystals, including a liquid crystal driving system that uses an electric field generated in a vertical direction between substrates, that is, a vertical electric field. Examples of a liquid crystal display device that drives liquid crystals using a vertical electric field include, but are not limited to, vertical-electric-field liquid crystal display devices provided with a twisted nematic (TN) system, a vertical alignment (VA) system, an electrically controlled birefringence (ECB) system, etc. As disclosed in Japanese Patent Application Laid-open Publication No. 2008-52161 (JP-A-2008-52161), there has also been developed a liquid crystal driving system that uses an electric field generated in a direction parallel to substrates (horizontal direction), that is, a horizontal electric field. Examples of a liquid crystal display device that drives liquid crystals using a horizontal electric field include, but are not limited to, horizontal-electric-field liquid crystal display devices provided with a fringe field switching (FFS) system, an in-plane switching (IPS) system, etc.

In the IPS mode, a first electrode and a second electrode are provided on the same layer, and an electric field is generated mainly in a direction parallel to the substrate surface. This configuration makes it difficult for the electric field to be generated in an area on the first electrode, thereby making it difficult for liquid-crystal molecules in the area to be driven.

In the FFS mode, a pixel electrode and a common electrode overlap in a direction perpendicular to the substrate surface with a dielectric film interposed therebetween, and an electric field extending mainly in a direction oblique to the substrate surface or a parabolic electric field (also referred to as a fringe electric field) is generated. This makes it easy for liquid-crystal molecules in an area on the pixel electrode to be driven. In other words, the FFS mode can provide a higher aperture ratio than the IPS mode does.

The horizontal-electric-field liquid crystal display device generates an electric field between the first electrode and the second electrode in a direction parallel to the substrate, thereby rotating the liquid crystal molecules in a plane parallel to the substrate surface. The liquid crystal display device uses a change in the light transmittance corresponding to the rotation of the liquid crystal molecules, thereby performing display. Such horizontal-electric-field liquid crystal display devices are required to achieve a higher response speed of the liquid crystals.

Japanese Patent Application Laid-open Publication No. 2013-109309 (JP-A-2013-109309) discloses a liquid crystal display device achieving a higher response speed of liquid crystals.

In the liquid crystal display device disclosed in JP-A-2013-109309, although the response speed of the liquid crystals is improved in the whole pixels, there is an area in which the liquid crystal molecule hardly move even when voltage is applied, and improvement in contrast is desired.

For the foregoing reasons, there is a need for a liquid crystal display device and an electronic apparatus that improve the contrast of entire pixels while improving the response speed of the entire pixels to further improve display quality in a plane.

SUMMARY

According to an aspect, a liquid crystal display device includes a first substrate, a second substrate arranged to be opposed to the first substrate, a liquid crystal layer arranged between the first substrate and the second substrate, a first electrode arranged between the first substrate and the liquid crystal layer, and a second electrode arranged at a position opposed to the first electrode. The first electrode includes an electrode base portion extending in a first direction, and a plurality of comb tooth portions extending in a second direction different from the first direction and protruding from the electrode base portion with a certain distance interposed therebetween. At least one of the first substrate and the second substrate includes a light-blocking part that reduces intensity of light passing therethrough at a position overlapping with at least one of the center of the comb tooth portion and the center between the adjacent comb tooth portions in a direction perpendicular to the first substrate.

According to another aspect, an electronic apparatus includes a liquid crystal display device, and a control device that supplies input signals to the liquid crystal display device. The liquid crystal display device includes a first substrate, a second substrate arranged to be opposed to the first substrate, a liquid crystal layer arranged between the first substrate and the second substrate, a first electrode arranged between the first substrate and the liquid crystal layer; and a second electrode arranged at a position opposed to the first electrode. The first electrode includes an electrode base portion extending in a first direction, and a plurality of comb tooth portions extending in a second direction different from the first direction and protruding from the electrode base portion with a certain distance interposed therebetween. At least one of the first substrate and the second substrate includes a light-blocking part that reduces intensity of light passing therethrough at a position overlapping with at least one of the center of the comb tooth portion and the center between the adjacent comb tooth portions in a direction perpendicular to the first substrate.

Additional features and advantages are described herein, and will be apparent from the following Detailed Description and the figures.

DETAILED DESCRIPTION

Figure 1:
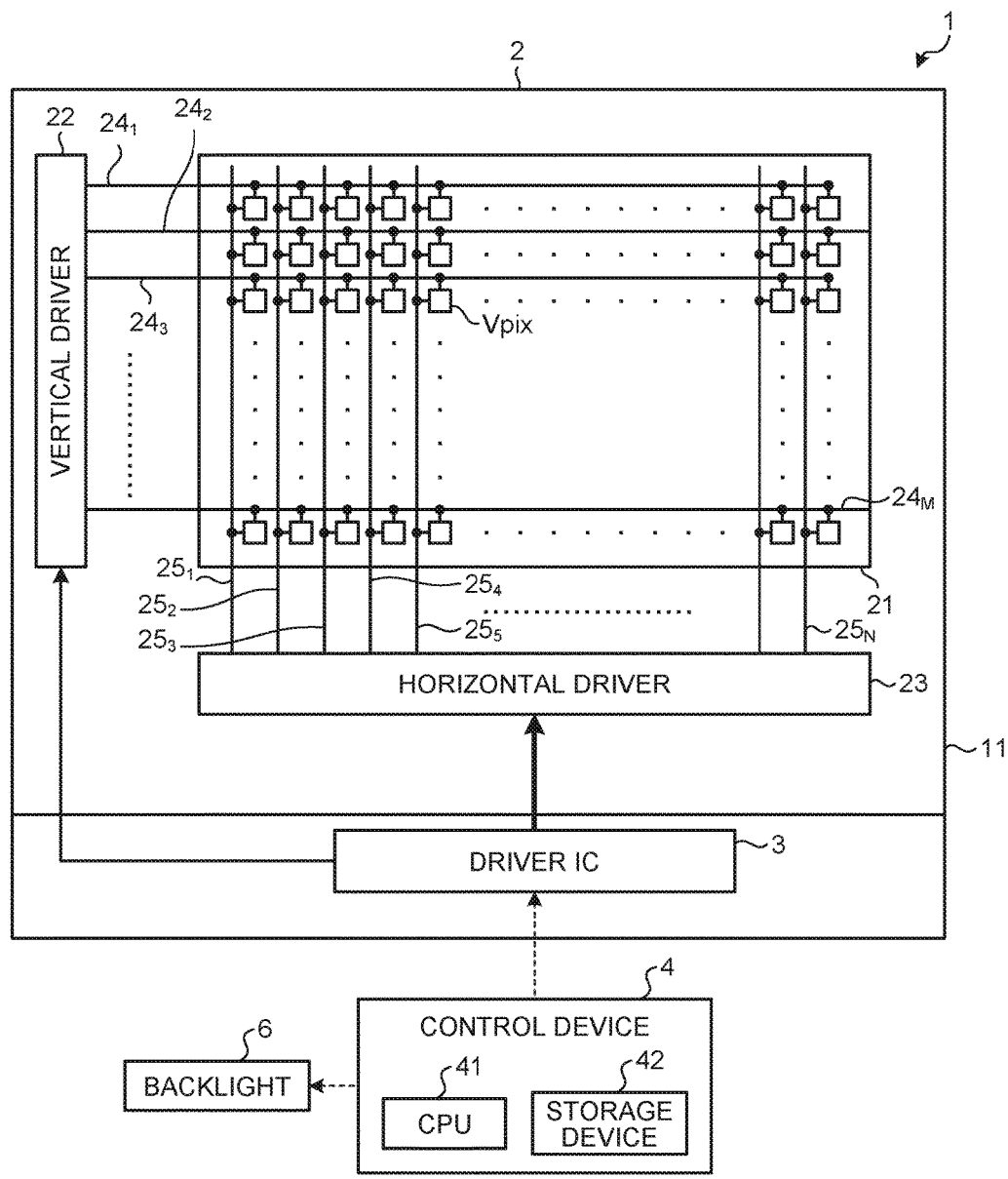
FIG. 1 is a block diagram illustrating a system configuration example of a liquid crystal display device according to an embodiment.

Exemplary embodiments according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only. Various changes and modifications made without departing from the spirit of the present invention and easily conceivable by those skilled in the art are naturally included in the scope of the present invention. The drawings may possibly illustrate the width, the thickness, the shape, and the like of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

FIG. 1 is a block diagram of an exemplary system configuration of a liquid-crystal display device according to the embodiment. A liquid-crystal display device 1 is a transmissive liquid-crystal display device and includes a display panel 2 and a driver IC 3. Flexible printed circuits (FPCs), which are not illustrated, transmit an external signal to the driver IC 3 or drive electric power for driving the driver IC 3. The display panel 2 includes a translucent insulation substrate such as a glass substrate 11, a display area 21, a horizontal driver (a horizontal drive circuit) 23, and a vertical driver (a vertical drive circuit) 22. The display area 21 is provided on the surface of the glass substrate 11 and is formed of a number of pixels each including a liquid-crystal cell arranged in a matrix (rows and columns). The glass substrate 11 includes a first substrate and a second substrate. In the first substrate, a number of pixel circuits each including an active element (e.g., a transistor) are arranged in a matrix. The second substrate is arranged facing the first substrate with a certain gap interposed therebetween. The gap between the first substrate and the second substrate is maintained to the certain gap by photo spacers arranged at respective positions on the first substrate. The gap between the first substrate and the second substrate is sealed with liquid crystals.

Exemplary System Configuration of the Liquid-Crystal Display Device

The display panel 2 includes the display area 21, the driver IC 3 having functions of an interface (I/F) and a timing generator, the vertical driver 22, and the horizontal driver 23 on the glass substrate 11.

In the display area 21, sub-pixels Vpix that include the liquid crystal layer have a matrix (row-and column) structure in which units each forming one pixel on display are arranged in m rows×n columns. In the present specification, a row indicates a pixel row including N sub-pixels Vpix arrayed in a direction. A column indicates a pixel column including M sub-pixels Vpix arrayed in a direction orthogonal to the direction in which the sub-pixels Vpix included in the row are arrayed. The values of M and N are determined depending on display resolution in the vertical direction and that in the horizontal direction, respectively. In the display area 21, with respect to the array of M-by-N sub-pixels Vpix, scanning lines $24_1, 24_2, 24_3 \ldots 24_M$ are arranged for each row and signal lines $25_1, 25_2, 25_3 \ldots 25_N$ are arranged for each column. In the embodiment, the scanning lines $24_1, 24_2, 24_3 \ldots 24_M$ may be collectively referred to as a scanning line 24, whereas the signal lines $25_1, 25_2, 25_3 \ldots 25_N$ may be collectively referred to as a signal line 25. In the embodiment, any scanning line of the scanning lines $24_1, 24_2, 24_3 \ldots 24_M$ may be expressed as a scanning line $24_{\alpha+1}$ ($0 \leq \alpha \leq M$), whereas any signal line of the signal lines $25_1, 25_2, 25_3 \ldots 25_N$ may be expressed as a signal line $25_{\beta+1}$ ($0 \leq \beta \leq N$).

The liquid crystal display device 1 receives a master clock, a horizontal synchronizing signal, and a vertical synchronizing signal, which are external signals from the outside. These signals are supplied to the driver IC 3. The driver IC 3 converts the level of the master clock, the horizontal synchronizing signal, and the vertical synchronizing signal at voltage amplitude of an external power source into a level at voltage amplitude of an internal power source required for driving the liquid crystals. Thus, the driver IC 3 generates a master clock, a horizontal synchronizing signal, and a vertical synchronizing signal. The driver IC 3 supplies the generated master clock, the generated vertical synchronizing signal, and the generated horizontal synchronizing signal to the vertical driver 22 and the horizontal driver 23. The driver IC 3 generates a common potential to be supplied to pixels in common to a common electrode COM for each sub-pixel Vpix, which will be described later, and supplies the common potential to the display area 21.

The vertical driver 22 sequentially samples and latches, in one horizontal period, display data output from the driver IC 3 in synchronization with a vertical clock pulse. The vertical driver 22 sequentially outputs and supplies the latched digital data of one line as a vertical scanning pulse to the scanning lines $24_m, 24_{m+1}, 24_{m+2} \ldots$ of the display area 21. Thus, the vertical driver 22 sequentially selects sub-pixels Vpix row by row. The vertical driver 22, for example, outputs the digital data to the scanning lines $24_m, 24_{m+1}, 24_{m+2} \ldots$ from the top of the display area 21, that is, the upper side in the vertical scanning, to the bottom of the display area 21, that is, the lower side in the vertical scanning. Alternatively, the vertical driver 22 may output the digital data to the scanning lines $24_m, 24_{m+1}, 24_{m+2} \ldots$ from the bottom of the display area 21, that is, the lower side in the vertical scanning, to the top of the display area 21, that is, the upper side in the vertical scanning in order.

The horizontal driver 23 is supplied with 6-bit digital video data Vsig of R (red), G (green), and B (blue), for example. The horizontal driver 23 writes display data to the sub-pixels Vpix of the row selected in the vertical scanning performed by the vertical driver 22 in units of a pixel, a plurality of pixels, or all the pixels via the signal line 25.

In the liquid crystal display device 1, continuous application of a direct current (DC) voltage with the same polarity to the liquid crystal elements may possibly deteriorate resistivity (resistance value specific to the substance) and the like of the liquid crystals. To suppress deterioration in the resistivity (resistance value specific to the substance) and the like of the liquid crystals, the liquid crystal display device 1 employs a driving method for reversing the polarity of video signals at a certain period based on the common potential of drive signals.

Some types of methods for driving a liquid crystal display panel are known, including a line inversion driving method, a dot inversion driving method, and a frame inversion driving method. The line inversion driving method is a method for reversing the polarity of video signals at a time period of 1H (H represents a horizontal period) corresponding to one line (one pixel row). The dot inversion driving method is a method for alternately reversing the polarity of video signals for pixels vertically and horizontally adjacent to each other. The frame inversion driving method is a method for reversing the polarity of video signals to be written to all the pixels in one frame corresponding to one screen with the same polarity at a time. The liquid crystal display device 1 may employ any one of the driving methods described above.

Figure 2:
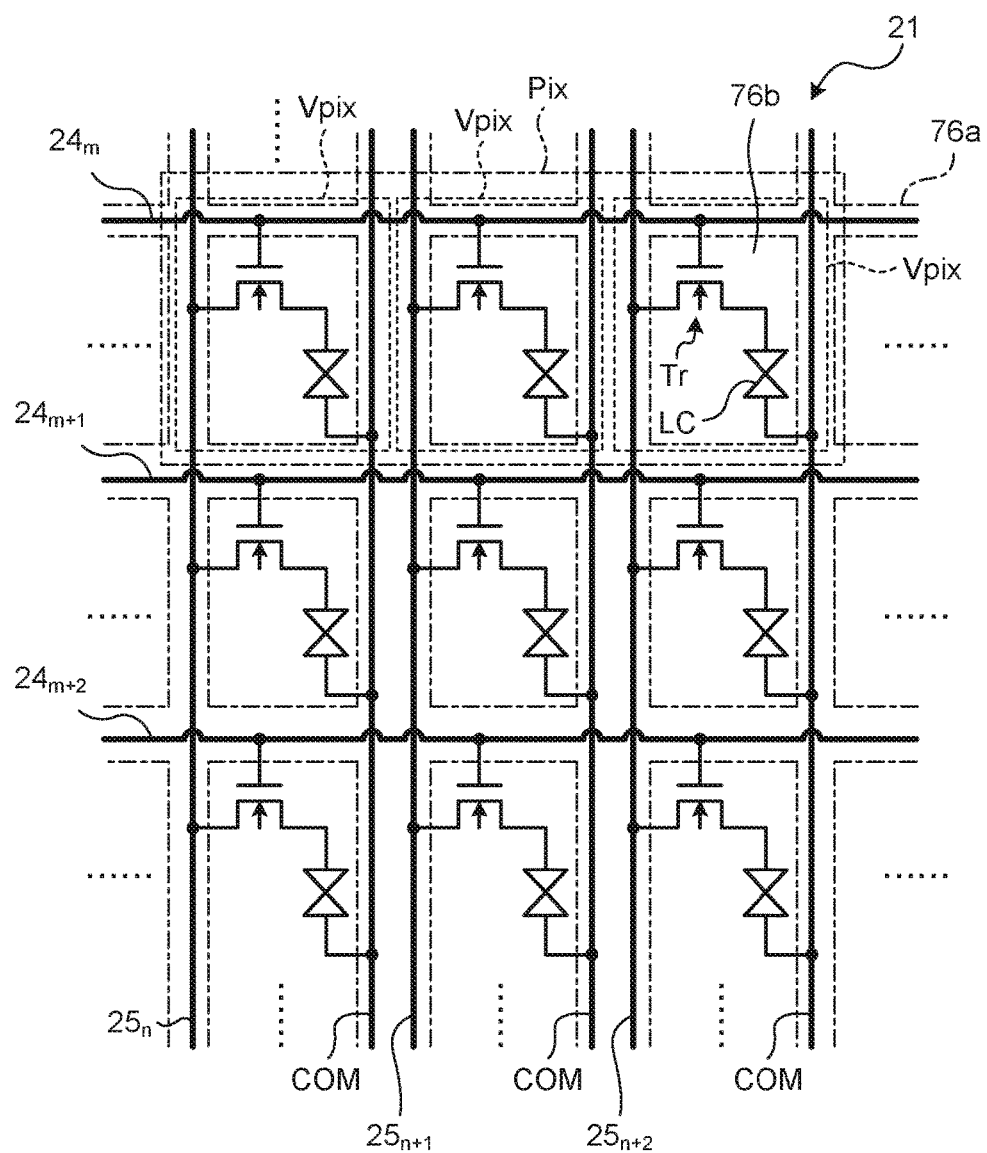
FIG. 2 is a circuit diagram illustrating a drive circuit that drives pixels in the liquid crystal display device according to the embodiment.

FIG. 2 is a circuit diagram illustrating a drive circuit that drives pixels in the liquid crystal display device according to the embodiment. In the display area 21, wiring of the signal lines $25_n, 25_{n+1}, 25_{n+2}$ and the scanning lines $24_m, 24_{m+1}, 24_{m+2}$ are formed, for example. The signal lines $25_n, 25_{n+1}, 25_{n+2}$ supply pixel signals to thin film transistor (TFT) elements Tr in respective sub-pixels Vpix as display data. The scanning lines $24_m, 24_{m+1}, 24_{m+2}$ drive respective TFT elements Tr. The signal lines $25_n, 25_{n+1}, 25_{n+2}$ extend on a plane parallel to the surface of the glass substrate 11 described above and supply the pixel signals for displaying an image on the sub-pixels Vpix. Each of the sub-pixels Vpix includes the TFT element Tr and a liquid crystal capacitor LC. The TFT element Tr is formed of a thin film transistor, and specifically of an n-channel metal oxide semiconductor (MOS) TFT in this example. One of the source and the drain of the TFT element Tr is coupled to the corresponding one of the signal lines $25_n, 25_{n+1}, 25_{n+2}$, the gate thereof is coupled to the corresponding one of the scanning lines $24_m, 24_{m+1}, 24_{m+2}$, and the other of the source and the drain thereof is coupled to one end of the liquid crystal capacitor LC. The one end of the liquid crystal capacitor LC is coupled to the other of the source and the drain of the TFT element Tr, whereas the other end thereof is coupled to the corresponding common electrode COM.

The sub-pixel Vpix is coupled to other sub-pixels Vpix belonging to the same row in the display area 21 by the corresponding one of the scanning lines $24_m, 24_{m+1}, 24_{m+2}$. The scanning lines $24_m, 24_{m+1}, 24_{m+2}$ are coupled to the vertical driver 22 and are supplied with the vertical scanning pulses of scanning signals from the vertical driver 22. The sub-pixel Vpix is further coupled to other sub-pixels Vpix belonging to the same column in the display area 21 by the corresponding one of the signal lines $25_n, 25_{n+1}, 25_{n+2}$. The signal lines $25_n, 25_{n+1}, 25_{n+2}$ are coupled to the horizontal driver 23 and are supplied with pixel signals from the horizontal driver 23. The sub-pixel Vpix is further coupled to the other sub-pixels Vpix belonging to the same column in the display area 21 by the corresponding common electrode COM. The common electrodes COM are coupled to the driver IC 3, and are supplied with drive signals from the driver IC 3.

The vertical driver 22 illustrated in FIG. 1 applies vertical scanning pulses to the gate of the TFT element Tr of the sub-pixels Vpix via the scanning lines $24_m, 24_{m+1}, 24_{m+2}$ illustrated in FIG. 2. Thus, the vertical driver 22 sequentially selects a row (a horizontal line) out of the rows of the sub-pixels Vpix arranged in a matrix in the display area 21 as a target of display drive. The horizontal driver 23 illustrated in FIG. 1 supplies pixel signals to the respective sub-pixels Vpix forming each horizontal line sequentially selected by the vertical driver 22 via the corresponding one of the signal lines $25_n$, $25_{n+1}$, $25_{n+2}$ illustrated in FIG. 2. These sub-pixels Vpix perform display of the horizontal line in accordance with the supplied pixel signals. The driver IC 3 applies drive signals, thereby driving common electrodes COM in each drive electrode block including a certain number of common electrodes COM.

As described above, the vertical driver 22 in the liquid crystal display device 1 performs driving so as to sequentially scan the scanning lines $24_m$, $24_{m+1}$, $24_{m+2}$, thereby sequentially selecting a horizontal line. The horizontal driver 23 in the liquid crystal display device 1 supplies the pixel signals to the sub-pixels Vpix belonging to the horizontal line, thereby performing display of the horizontal line. In performing the display operation, the driver IC 3 applies the drive signals to the common electrode COM corresponding to the horizontal line.

A control device 4 includes, for example, a central processing unit (CPU) 41 serving as an arithmetic unit and a storage device 42 serving as a memory, and can implement various functions by executing computer programs using such hardware resources. Specifically, the control device 4 reads out a computer program stored in the storage device 42 to be loaded on the memory, and causes the CPU 41 to execute a command included in the computer program loaded on the memory. The control device 4 then performs control so that the driver IC 3 can handle an image to be displayed on the display panel 2 as information of image input gradation depending on a command execution result by the CPU 41. A backlight 6 irradiates the display panel 2 with light according to a control signal of the control device 4, and allows light to be incident on the entire surface of the display area 21. The backlight 6 includes, for example, a light source and a light guide plate that guides light output from the light source to be emitted to the back surface of the display panel 2. The backlight 6 includes a plurality of light sources arranged in a direction along one side of the display area 21, and an amount of light from each light source may be independently controlled. Accordingly, the backlight 6 can cause light to be incident on part of the display panel 2 due to the light emitted from only part of the light sources. In the embodiment, the backlight 6 arranged on the back surface side of the display panel 2 is used as the light source of the liquid crystal display device 1. Alternatively, the light source may be a front light arranged on the front surface side of the display panel 2.

The display area 21 includes a color filter. The color filter includes a grid-shaped black matrix 76a and apertures 76b. The black matrix 76a is formed to cover the outer periphery of the sub-pixel Vpix as illustrated in FIG. 2. In other words, the black matrix 76a is arranged at a boundary between the sub-pixels Vpix that are two-dimensionally arranged and thus is formed into a grid shape. The black matrix 76a is made of a material having a high light absorption rate. The aperture 76b serves as an aperture formed by the grid shape of the black matrix 76a and is arranged at a position corresponding to the sub-pixel Vpix. As described above, the black matrix 76a is a light-blocking part (a second light-blocking part) having a light blocking property that surrounds the aperture of the sub-pixel Vpix.

The aperture 76b includes color areas colored with three colors of red (R), green (G), and blue (B), for example. In the color filter, the color areas of the color filter in the three colors of red (R), green (G), and blue (B) are periodically arrayed on the respective apertures 76b, for example. Thus, the color areas in the three colors of R, G, and B correspond to the respective sub-pixels Vpix illustrated in FIG. 2 and serve as a pixel Pix as a set.

The color filter may be made by a combination of other colors as long as it is colored differently. Typically, the luminance of the color area of green (G) is higher than that of the color areas of red (R) and blue (B). The display area may be provided with no color filter, resulting in production of white color. Alternatively, the color filter may be made of a transmissive resin to produce a white color.

Viewed from a direction orthogonal to the front surface, the scanning line 24 and the signal line 25 in the display area 21 are arranged at an area overlapping with the black matrix 76a. In other words, the scanning line 24 and the signal line 25 are hidden behind the black matrix 76a viewed from a direction orthogonal to the front surface. As described above, the black matrix 76a is a light-blocking part (a second light-blocking part) having a light blocking property arranged to be opposed to the scanning line 24 or the signal line 25. The display area 21 has the aperture 76b in each area in which no black matrix 76a is arranged.

As illustrated in FIG. 2, the scanning lines $24_m$, $24_{m+1}$, $24_{m+2}$ are arranged at regular intervals, and the signal lines $25_n$, $25_{n+1}$, $25_{n+2}$ are also arranged at regular intervals. Adjacent scanning lines 24 do not necessarily have a regular interval therebetween, and adjacent signal lines 25 do not necessarily have a regular interval therebetween either. The sub-pixels Vpix are arranged facing each other in the same direction at the respective areas sectioned by the proximate scanning lines $24_m$, $24_{m+1}$, $24_{m+2}$ and the proximate signal lines $25_n$, $25_{+1}$, $25_{+2}$.

Figure 3:
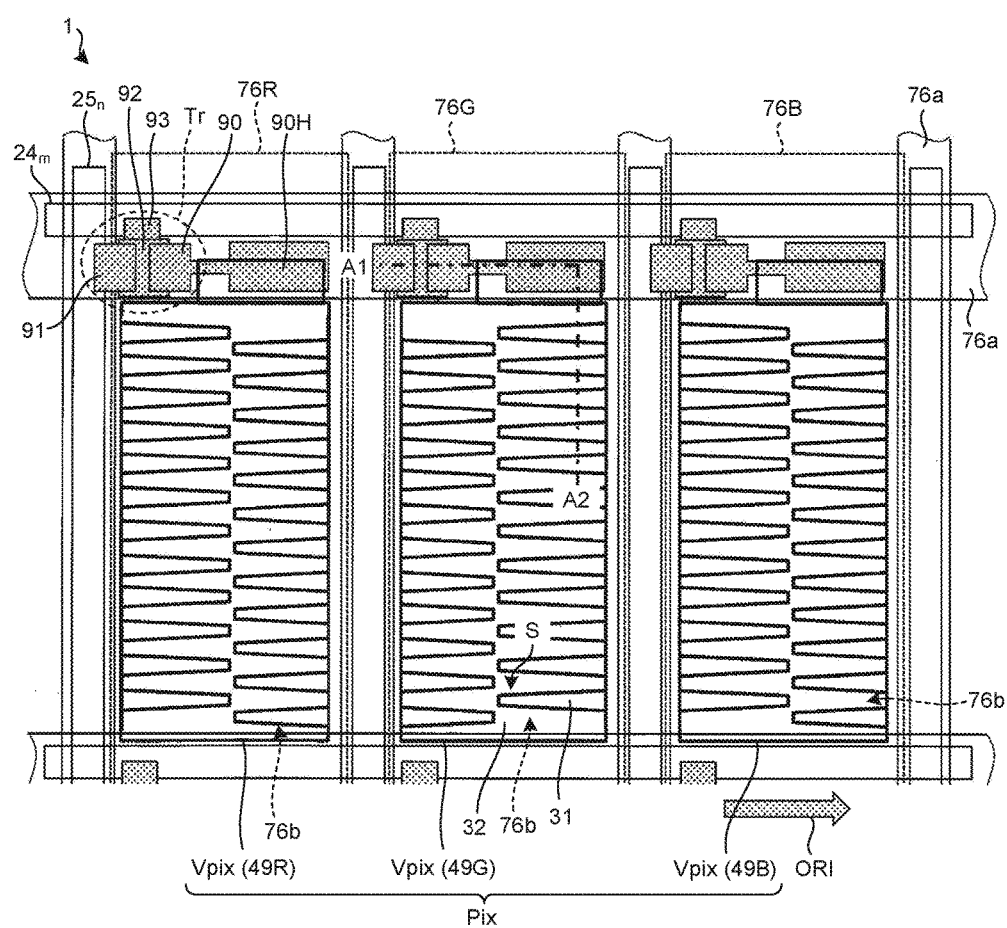
FIG. 3 is a plan view for explaining the pixels in the liquid crystal display device according to the embodiment.
Figure 4:
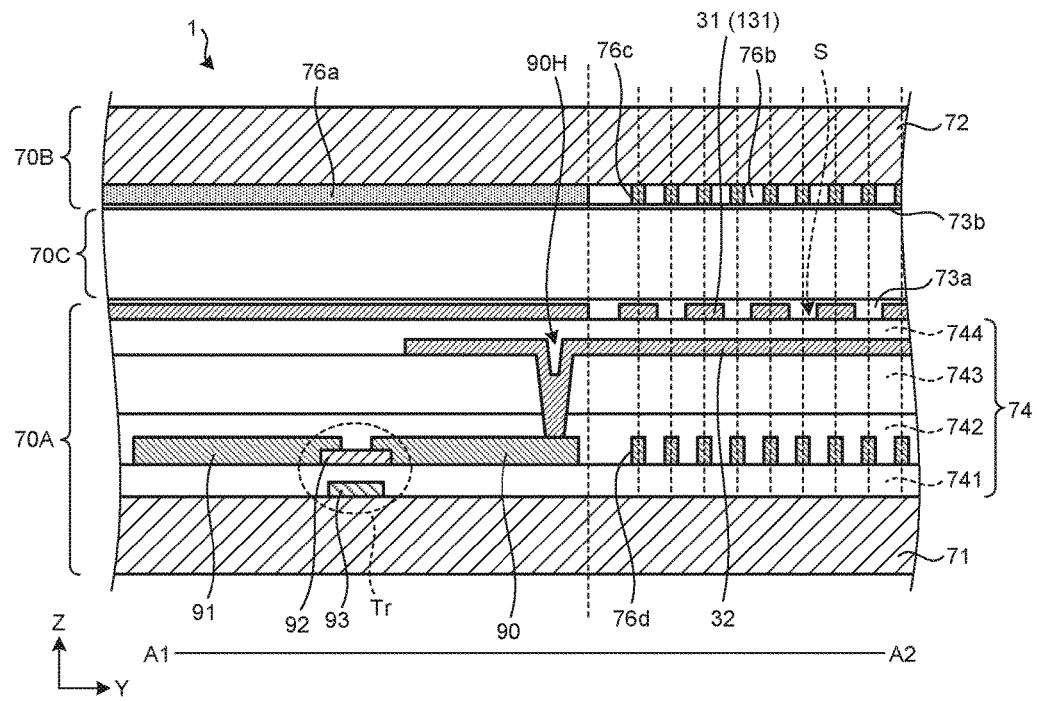
FIG. 4 is a schematic diagram illustrating a sectional view along the line A1-A2 of FIG. 3.

FIG. 3 is a plan view for explaining the pixels in the liquid crystal display device according to the embodiment. FIG. 4 is a schematic diagram illustrating a sectional view along the line A1-A2 of FIG. 3. As illustrated in FIGS. 3 and 4, in the embodiment, one direction along a plane of the liquid crystal display device 1 (the display panel 2 illustrated in FIG. 1) is assumed to be an X-direction, a direction orthogonal to the X-direction is assumed to be a Y-direction, and a direction orthogonal to the X-Y plane is assumed to be a Z-direction. In each sub-pixel Vpix, the aperture 76b is formed on the lower side in the vertical scanning (lower side in FIG. 3). The TFT element Tr is arranged on the left on the upper side in the vertical scanning (upper side in FIG. 3). A contact 90H is formed on the right on the upper side in the vertical scanning (upper side in FIG. 3). The contact 90H is used to couple a pixel electrode to a drain electrode 90 of the TFT element Tr. The drain of the TFT element Tr includes part of a semiconductor layer (an active layer) and the drain electrode 90. Similarly, the source of the TFT electrode Tr includes another part of the semiconductor layer (active layer) and a source electrode 91. Color filters 76R, 76G, and 76B are formed by periodically arraying the color areas of the color filters in the three colors of red (R), green (G), and blue (B) on the respective apertures 76b, for example. Thus, the color areas 49R, 49G, and 49B in the three colors of R, G, and B illustrated in FIG. 3 are formed in the respective sub-pixels Vpix illustrated in FIG. 2.

As illustrated in FIG. 4, the liquid crystal display device 1 includes a pixel substrate (the first substrate) 70A, a counter substrate (the second substrate) 70B arranged facing the surface of the pixel substrate 70A in a direction perpendicular thereto, and a liquid crystal layer 70C inserted between the pixel substrate 70A and the counter substrate 70B. The surface of the pixel substrate 70A on the side opposite to the liquid crystal layer 70C is provided with the backlight 6. Photo spacers (not illustrated) maintain a gap between the pixel substrate 70A and the counter substrate 70B to a certain gap.

In the embodiment, an electric field (a horizontal electric field) is generated between a first electrode 31 and a second electrode 32 laminated in a direction (the Z-direction) perpendicular to the surface of a TFT substrate 71 of the pixel substrate 70A and in a direction parallel to the TFT substrate 71. As a result, the liquid crystal molecules in the liquid crystal layer 70C rotate in a plane parallel to the substrate surface. The liquid crystal display device 1 uses a change in the light transmittance corresponding to the rotation of the liquid crystal molecules, thereby performing display. The second electrode 32 illustrated in FIG. 4 is the pixel electrode, whereas the first electrode 31 is the common electrode COM, for example. As illustrated in FIG. 4, a first orientation film 73a is provided between the liquid crystal layer 70C and the pixel substrate 70A, whereas a second orientation film 73b is provided between the liquid crystal layer 70C and the counter substrate 70B.

The counter substrate 70B includes a glass substrate 72 and the light-blocking black matrix 76a formed on one surface of the glass substrate 72. The black matrix 76a faces the liquid crystal layer 70C in a direction perpendicular to the pixel substrate 70A. In the liquid crystal display device 1 according to the embodiment, the aperture 76b also includes a light-blocking part 76c having a light blocking property in the same layer as the black matrix 76a. The light-blocking part 76c is in the same layer as the black matrix 76a, and thereby can be formed of the same material as the black matrix 76a without additional processes. A position of the light-blocking part 76c will be described later.

The pixel substrate 70A includes the TFT substrate 71 serving as a circuit substrate. The scanning line $24_m$ illustrated in FIG. 3 is formed on the TFT substrate 71. A gate electrode 93 is electrically coupled to the scanning line $24_m$. While the scanning line $24_m$ and the gate electrode 93 are formed in different layers in FIGS. 3 and 4, the scanning line $24_m$ and the gate electrode 93 may be integrally formed.

A semiconductor layer 92 containing amorphous silicon (a-Si) forming the TFT element Tr is formed in an upper layer of the gate electrode 93. The semiconductor layer 92 is coupled to the source electrode 91 forming the TFT element Tr. The source electrode 91 is an electric conductor and is electrically coupled to a part of the semiconductor layer 92. The source electrode 91 is electrically coupled to the signal line $25_n$ illustrated in FIG. 3 (not illustrated in FIG. 4). The semiconductor layer 92 is coupled to the drain electrode 90 forming the TFT element Tr. The drain electrode 90 is electrically coupled to another part of the semiconductor layer 92. While the signal line $25_n$ and the source electrode 91 are formed in different layers in FIG. 3, the signal line $25_n$ and the source electrode 91 may be integrally formed. The semiconductor layer 92 may contain LTPS (Low temperature Polysilicon) or oxide instead of amorphous silicon.

In the liquid crystal display device 1 according to the embodiment, the aperture 76b also includes therein a light-blocking part 76d having a light blocking property in the same layer as the source electrode 91 or the drain electrode 90. The light-blocking part 76d is included in the pixel substrate 70A. A material of the light-blocking part 76d is the same as that of the source electrode 91 or the drain electrode 90 that is wiring for causing the first electrode 31 or the second electrode 32 to work. Due to this, a forming pattern of the light-blocking part 76d has high accuracy, and additional processes are not required. A position of the light-blocking part 76d will be described later. The liquid crystal display device 1 according to the embodiment may include at least one of the light-blocking part 76c and the light-blocking part 76d illustrated in FIG. 4.

An insulation layer 74 is formed of laminated insulation films, which are an insulation film 741 between the scanning line $24_m$ and the semiconductor layer 92, an insulation film 742 between the semiconductor layer 92 and the signal line $25_n$, an insulation film 743 between the signal line $25_n$ and the second electrode 32, and an insulation film 744 between the second electrode 32 and the first electrode 31, for example. The insulation films 741, 742, 743, and 744 may be made of the same insulation material, or any one thereof may be made of a different insulation material. For example, the insulation film 743 is made of an organic insulation material such as a polyimide resin and the other insulation films (insulation films 741, 742, and 744) are made of an inorganic insulation material such as silicon nitride and silicon oxide.

The contact 90H made of a conductive metal is formed in what is called a contact hole. The contact 90H couples the drain electrode 90 and the second electrode 32. The first electrode 31 serves as the common electrode COM and is supplied with a common potential to be supplied to the pixels in common. The first electrode 31 and the second electrode 32 are translucent electrodes made of a translucent conductive material (a translucent conductive oxide) such as indium tin oxide (ITO).

Figure 5:
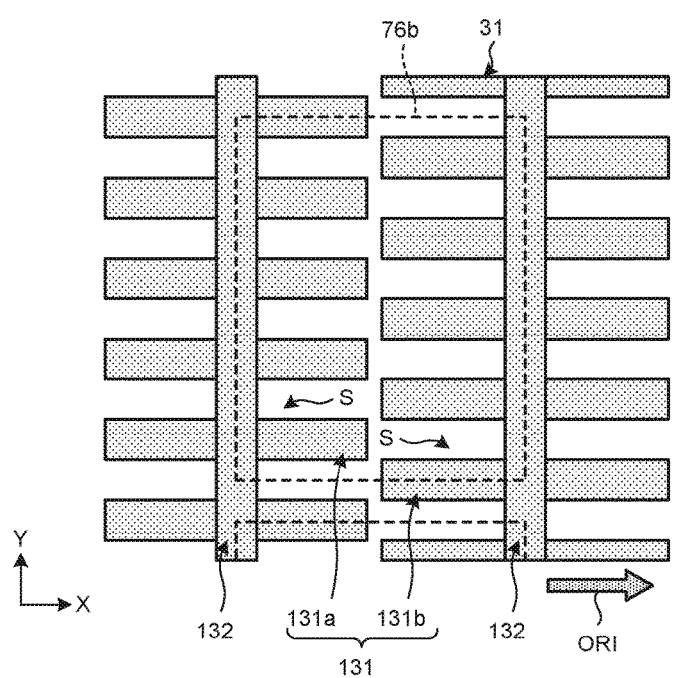
FIG. 5 is a schematic diagram for explaining a relation between a shape of a first electrode and an aperture according to the embodiment.

FIG. 5 is a schematic diagram for explaining a relation between the shape of the first electrode and the aperture according to the embodiment. As illustrated in FIG. 5, the first electrode 31 has a comb teeth shape formed by slits S that are areas with no conductive material provided. The first electrode 31 includes a plurality of comb tooth portions 131 protruding from an electrode base portion 132 extending in the Y-direction. The comb tooth portions 131 include comb tooth portions 131a and comb tooth portions 131b. The comb tooth portions 131a and the comb tooth portions 131b extend in opposite directions from the electrode base portion 132. The comb tooth portions 131a protrude from the electrode base portion 132 with a certain distance interposed therebetween. Similarly, the comb tooth portions 131b protrude from the electrode base portion 132 with a certain distance interposed therebetween. From each electrode base portion 132, the comb tooth portions 131a extend in the X-direction, whereas the comb tooth portions 131b extend in a direction opposite to the X-direction. Similarly to the comb tooth portions 131a or the comb tooth portions 131b, the electrode base portion 132 is made of translucent conductive material (translucent conductive oxide) such as indium tin oxide (ITO).

The first orientation film 73a described above is subjected to orientation processing in an orientation direction ORI (a first orientation direction) illustrated in FIGS. 3 and 5 such that the liquid crystal molecules have a certain initial orientation in the X-direction. The second orientation film 73b is subjected to orientation processing in a direction (a second orientation direction) antiparallel to the orientation direction ORI of the first orientation film 73a. The orientation directions of the first orientation film 73a and the second orientation film 73b are antiparallel to each other. As described above, the comb tooth portions 131a extend in the X-direction, and the comb tooth portions 131b extend in the direction opposite to the X-direction. The orientation direction ORI is parallel to the direction in which the comb tooth portions 131a or the comb tooth portions 131b extend. The orientation direction ORI is considered to be parallel as long as it is sufficiently parallel to maintain the rotation direction of liquid crystal molecules LCM illustrated in FIG. 9, which will be described later. More specifically, the orientation direction ORI allows a manufacturing error of 0 degree or greater to 0.5 degree or less. To provide a certain orientation to the liquid crystal molecules, the following orientation films may be used: an orientation film formed by performing rubbing on an organic film such as a polyimide; or an optical orientation film that can be provided with a specific liquid-crystal orientation capability by irradiating the film with light such as ultraviolet rays. In this way, according to the embodiment, the first orientation film 73a and the second orientation film 73b are subjected to rubbing treatment to have the certain initial orientation. However, a method of providing an initial orientation to the first orientation film 73a and the second orientation film 73b is not limited to the rubbing treatment. The first orientation film 73a and the second orientation film 73b may be formed by using a material having optical orientation to have the certain initial orientation.

Figure 6:
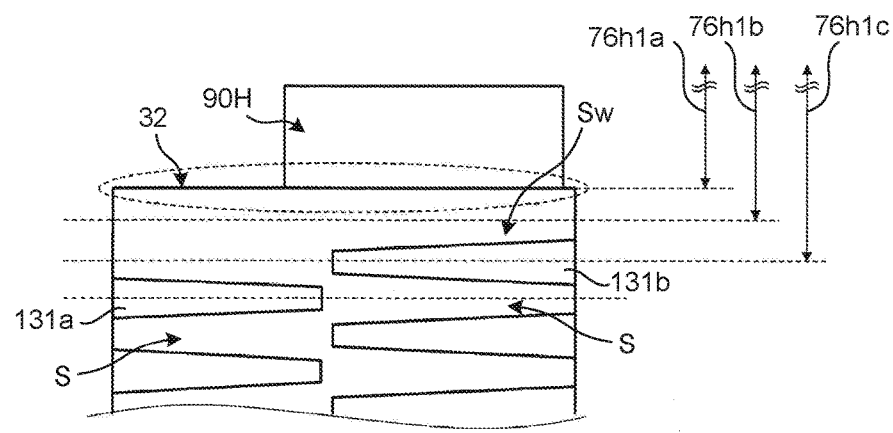
FIG. 6 is a schematic diagram for explaining a relation between the shape of the first electrode and a shaded position according to the embodiment.

FIG. 6 is a schematic diagram for explaining a relation between the shape of the first electrode and a shaded position according to the embodiment. The black matrix 76a only needs to shade the sub-pixel Vpix to the position of a width 76h1a illustrated in FIG. 6, thereby hiding the contact 90H. An electric field applied to the endmost slit Sw between the comb tooth portion 131b closest to the edge of the aperture 76b and the contact 90H has different distribution from that of an electric field applied to the slit S between adjacent comb tooth portions 131a or between adjacent comb tooth portions 131b. If the black matrix 76a shades the sub-pixel Vpix to the position of a width 76h1b illustrated in FIG. 6 to hide the contact 90H and more than half of the endmost slit Sw, the rate of change in the transmittance of the endmost slit Sw can be made closer to that of the slit S. Alternatively, if the black matrix 76a shades the sub-pixel Vpix to the position of a width 76h1c illustrated in FIG. 6 to hide the contact 90H and the endmost slit Sw, it is not necessary to consider the difference between the rates of change in the transmittance of the endmost slit Sw and the slit S. This structure can make luminance in the aperture 76b uniform.

Figure 7:
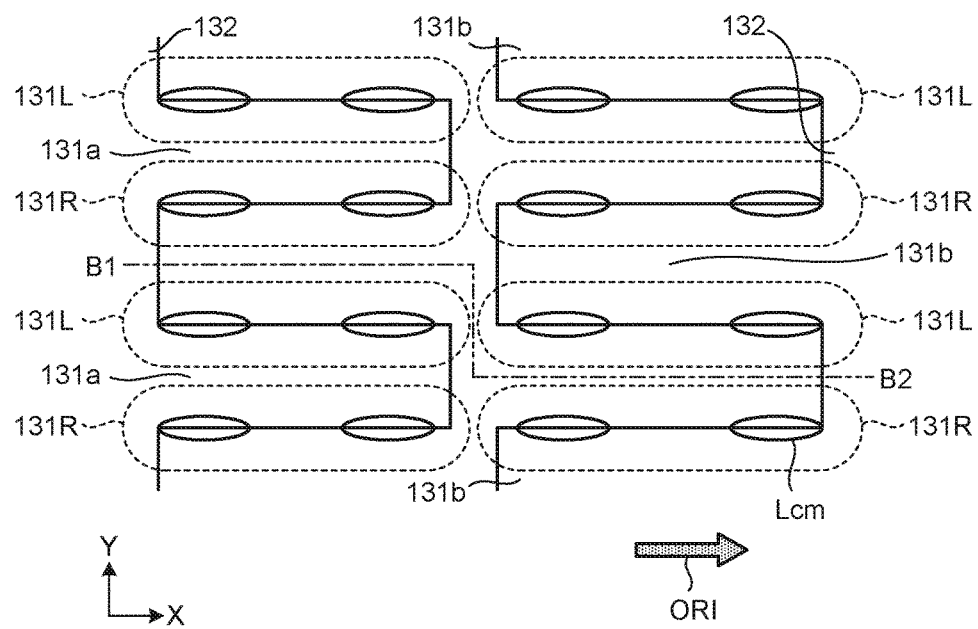
FIG. 7 is an explanatory diagram for explaining orientation of liquid crystals in a state where no voltage to generate an electric field between the first electrode and a second electrode is applied in the liquid crystal display device according to the embodiment.
Figure 8:
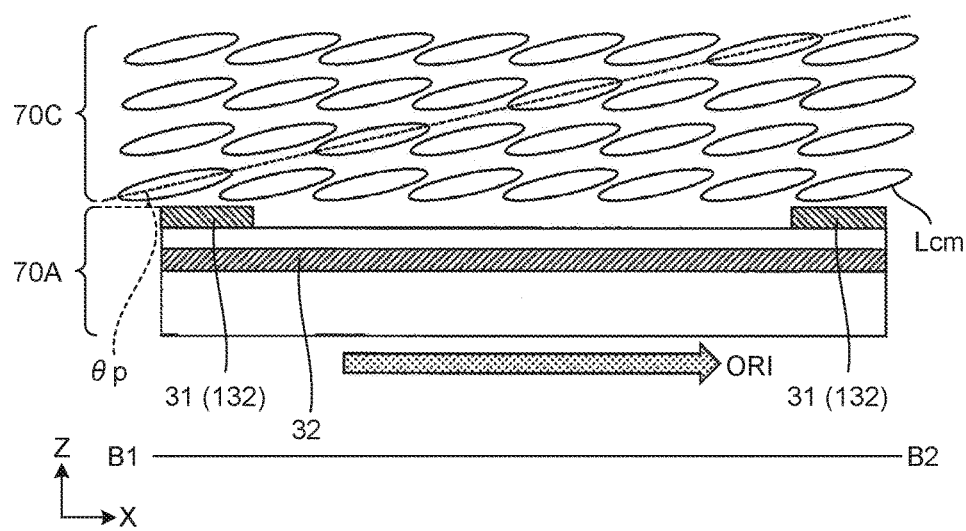
FIG. 8 is a schematic diagram illustrating a sectional view along the line B1-B2 of FIG. 7.
Figure 9:
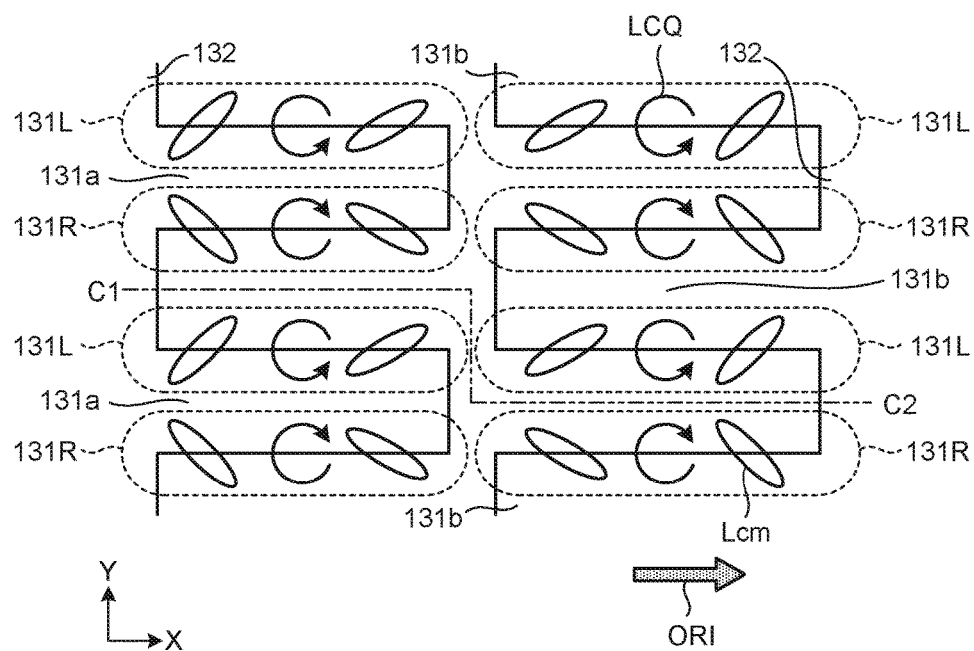
FIG. 9 is an explanatory diagram for explaining orientation of the liquid crystals in a state where the voltage to generate an electric field between the first electrode and the second electrode is applied in the liquid crystal display device according to the embodiment.
Figure 10:
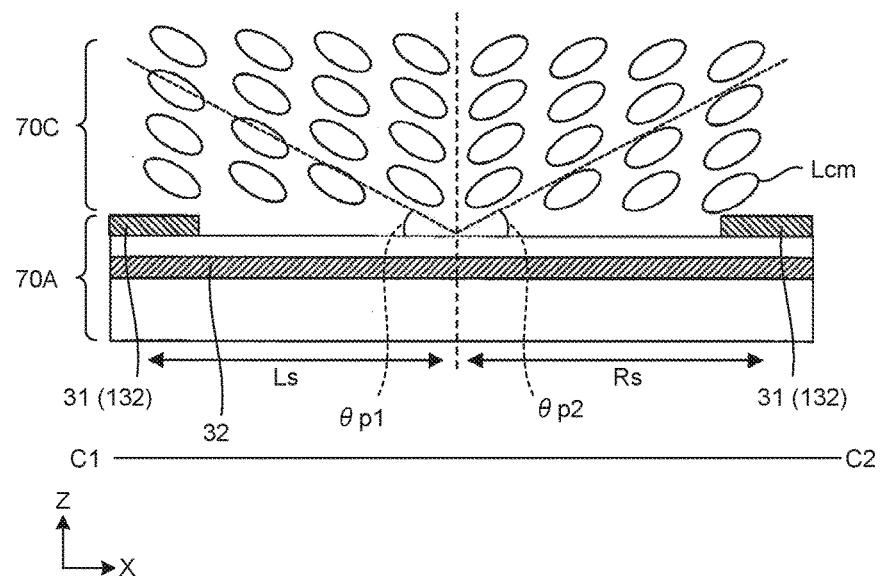
FIG. 10 is a schematic diagram illustrating a sectional view along the line C1-C2 of FIG. 9.
Figure 11:
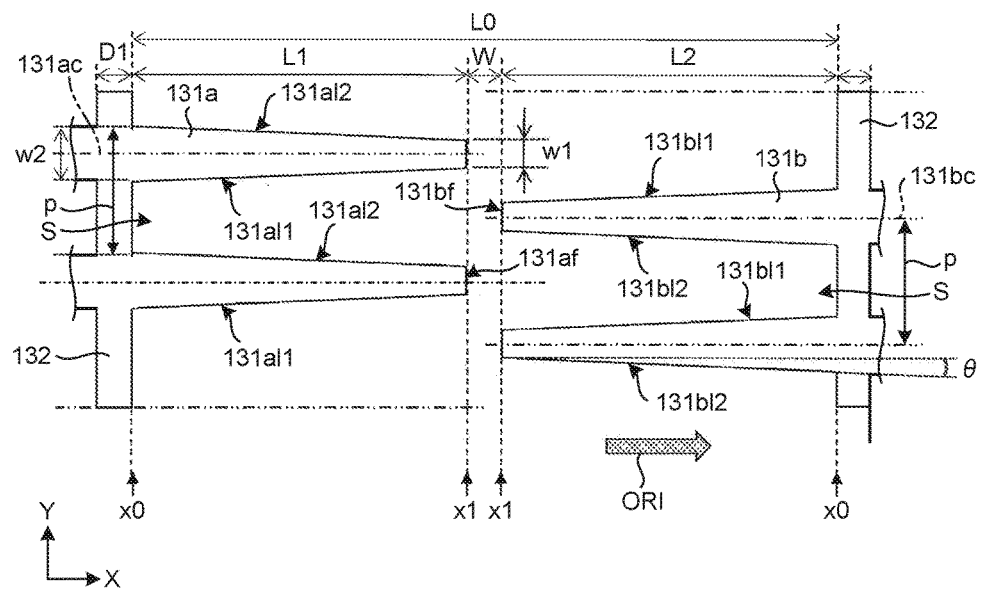
FIG. 11 is a schematic diagram for explaining in detail the shape of the first electrode in the pixel according to the embodiment.

FIG. 7 is an explanatory diagram for explaining orientation of the liquid crystals in a state where no voltage to generate an electric field between the first electrode and the second electrode is applied in the liquid crystal display device according to the embodiment. FIG. 8 is a schematic diagram illustrating a sectional view along the line B1-B2 of FIG. 7. FIG. 9 is an explanatory diagram for explaining orientation of the liquid crystals in a state where the voltage to generate an electric field between the first electrode and the second electrode is applied in the liquid crystal display device according to the embodiment. FIG. 10 is a schematic diagram illustrating a sectional view along the line C1-C2 of FIG. 9. FIG. 11 is a schematic diagram for explaining in detail the shape of the first electrode in the pixel according to the embodiment.

As described above, the first orientation film 73a is subjected to orientation processing in the orientation direction ORI illustrated in FIGS. 3 and 5 such that the liquid crystal molecules have a certain initial orientation in the X-direction. In a case where no voltage to generate an electric field between the first electrode 31 and the second electrode 32 is applied, the long-axis direction of liquid crystal molecules Lcm in the liquid crystal layer 70C tends to be aligned parallel to the direction in which the comb tooth portions 131a and the comb tooth portions 131b extend as illustrated in FIG. 7. As a result, the liquid crystal molecules Lcm are initially oriented parallel to the direction in which the comb tooth portions 131a and the comb tooth portions 131b extend at neighboring areas of a right long side 131R and a left long side 131L of the comb tooth portions 131a and the comb tooth portions 131b facing each other in the width direction of the slit S. The liquid crystal molecules Lcm illustrated in FIG. 8 are initially oriented along the orientation direction ORI and upward with respect to the orientation direction ORI so as to have a pretilt angle $\theta p$ with respect to the surface of the TFT substrate 71.

When a voltage to generate an electric field between the first electrode 31 and the second electrode 32 is applied, the liquid crystal molecules Lcm rotate in a liquid-crystal rotation direction LCQ as illustrated in FIG. 9. In other words, the liquid-crystal rotation direction LCQ is a direction of twist or rotation of the liquid crystals in the X-Y plane. The liquid crystal molecules Lcm positioned at the neighboring area of the right long side 131R and those at the neighboring area of the left long side 131L are affected by electric fields in opposite directions and thus are likely to rotate in opposite directions.

As described above, when a voltage is applied to the first electrode 31 and the second electrode 32, in the liquid crystal layer 70C of the liquid crystal display device 1 according to the embodiment, the liquid crystal molecules Lcm in the neighboring area of the right long side 131R rotate in a direction opposite to a rotating direction of those in the neighboring area of the left long side 131L. The right long side 131R is one of the sides of adjacent comb tooth portions 131a (131b) facing the slit S in the width direction thereof, whereas the left long side 131L is the other of the sides. The liquid crystal molecules Lcm respond to a change in the electric field between the first electrode 31 and the second electrode 32 at higher speed in the liquid crystal display device 1 according to the embodiment than in the FFS-mode liquid crystal display device disclosed in JP-A-2008-52161. As a result, the liquid crystal display device 1 according to the embodiment achieves a higher response speed.

The response speed is a speed at which the transmittance of the liquid crystals is shifted between certain levels when a voltage is applied to the first electrode 31 and the second electrode 32. In other words, the response speed is specified by a time required to shift the transmittance from a state where no voltage is applied (for example, transmittance=0) to a state where a voltage is applied (transmittance=1) or a time required to shift the transmittance from the state where a voltage is applied to the state where no voltage is applied.

When a voltage to generate an electric field between the first electrode 31 and the second electrode 32 is applied, the long-axis direction of the liquid crystal molecules Lcm rotates in a plane (X-Y plane) parallel to the surface of the pixel substrate 70A (TFT substrate 71) and changes also in the Z-direction as illustrated in FIG. 10. The first electrode 31 and the second electrode 32 are arranged facing each other in a direction perpendicular to the surface of the pixel substrate 70A (TFT substrate 71). Therefore, the electric field generated between the first electrode 31 and the second electrode 32 serves as a fringe electric field passing through the slits S. The fringe electric field causes the long axis of the liquid crystal molecules Lcm to rotate in the liquid-crystal rotation directions LCQ (clockwise and counterclockwise) in the X-Y plane illustrated in FIG. 9 and to rise in the direction (Z-direction) perpendicular to the surface of the pixel substrate 70A (TFT substrate 71). The liquid-crystal rotation directions LCQ may possibly be mixed at the center area of the slits S.

As illustrated in FIG. 10, the long-axis direction of the liquid crystal molecules Lcm has an angle θp2 larger than the pretilt angle θp in a slit area Rs between the comb tooth portions 131b. The long-axis direction of the liquid crystal molecules Lcm has an angle θp1 opposite to the pretilt angle θp in a slit area Ls between the comb tooth portions 131a. The long-axis direction of the liquid crystal molecules Lcm in the slit area Ls is less likely to rise and may have lower orientation stability than the long-axis direction of the liquid crystal molecules Lcm in the slit area Rs does.

By specifying the shape of the first electrode 31 more finely as illustrated in FIG. 11, it is possible to increase the responsiveness of the liquid crystal display device 1 according to the embodiment. As illustrated in FIG. 11, L0 represents a total slit length between the electrode base portions 132 in the X-direction, for example. L1 represents a comb tooth protrusion length of the comb tooth portions 131a in the X-direction. The comb tooth protrusion length L1 corresponds to a length from a position x1 of a tip 131af of the comb tooth portions 131a to a protrusion start position x0 in the electrode base portion 132. Similarly, L2 represents a comb tooth protrusion length of the comb tooth portions 131b in the X-direction. The comb tooth protrusion length L2 corresponds to a length from a position x1 of a tip 131bf of the comb tooth portions 131b to a protrusion start position x0 in the electrode base portion 132. The width of the tip 131af of the comb tooth portions 131a and the tip 131bf of the comb tooth portions 131b in the Y-direction is w1. The total slit length L0 is preferably set to a value equal to or greater than 10 μm to a value equal to or smaller than 60 μm, for example. The total slit length L0 is more preferably set smaller than 40 μm, specifically to 20 μm, for example. In the liquid crystal display device 1 according to the embodiment, a decrease in the total slit length L0 increases the orientation stability of the liquid crystals, whereas an increase in the total slit length L0 increases the luminance.

As described above, the liquid crystal molecules Lcm in the slit area Ls in FIG. 10 may possibly be less likely to rise in the long-axis direction than those in the slit area Rs in the long-axis direction and have lower orientation stability than those in the slit area Rs do. To make the slit area Ls smaller than the slit area Rs, the comb tooth protrusion length L1 illustrated in FIG. 11 is made smaller than the comb tooth protrusion length L2 of the comb tooth portions 131b positioned on the upstream of the comb tooth portions 131a in the orientation direction ORI. Thus, the liquid crystal display device 1 according to the embodiment can increase the orientation stability.

The width w1 of the tip 131af of the comb tooth portions 131a and the tip 131bf of the comb tooth portions 131b in the Y-direction is set to a value equal to or greater than 2 μm to a value equal to or smaller than 5 μm, for example. Setting the width w1 to a smaller value can increase the response speed.

A slit pitch (an array pitch) p between adjacent comb tooth portions 131a is equal to an array pitch between adjacent comb tooth portions 131b. The tip 131af of the comb tooth portions 131a and the tip 131bf of the comb tooth portions 131b are arranged alternately in the Y-direction. With this structure, the right long side 131R of the comb tooth portions 131a and the right long side 131R of the comb tooth portions 131b are aligned in the X-direction as illustrated in FIG. 9. With this structure, the left long side 131L of the comb tooth portions 131a and the left long side 131L of the comb tooth portions 131b are also aligned in the X-direction as illustrated in FIG. 9. As a result, the liquid-crystal rotation directions LCQ in which the liquid crystal molecules Lcm rotate are the same direction viewed in the X-direction, thereby stabilizing the rotation behavior of the liquid crystal molecules Lcm. Because a decrease in the slit pitch p increases the response speed, the slit pitch p is preferably set smaller than 9 μm.

The gap between the tip 131af of the comb tooth portions 131a and the tip 131bf of the comb tooth portions 131b illustrated in FIG. 11 corresponds to a width W in the X-direction of a communicating aperture extending in the Y-direction. The width W is preferably set to a smaller value. The width W of the communicating aperture in the X-direction is set to 7 μm or smaller, for example, and more preferably to 4 μm or smaller. The width W of the communicating aperture in the X-direction may be set to 0 or smaller. In a case where W=0 is satisfied, for example, the tip 131af of the comb tooth portions 131a and the tip 131bf of the comb tooth portions 131b are aligned in the Y-direction. In this case, the tips are arranged with gaps interposed therebetween in the Y-direction, whereby a plurality of slits S communicate with one another. In a case where W<0 is satisfied, the tip 131af of the comb tooth portions 131a and the tip 131bf of the comb tooth portions 131b enter into respective slits S adjacent thereto in the X-direction. In other words, the comb tooth portions 131a and the comb tooth portion 131b are alternately engaged.

The width of the comb tooth portions 131a in the Y-direction at the protrusion start position x0 in the electrode base portion 132 is represented by w2 and is larger than the width w1 of the tip 131af of the comb tooth portions 131a in the Y-direction. Thus, the comb tooth portions 131a have a trapezoidal shape. A long side 131a/1 and a long side 131a/2 of the comb tooth portions 131a are oblique to a reference direction of a virtual line 131ac passing through the center of the comb tooth portions 131a (X-direction in which the comb tooth portions 131a extend) by an angle θ. Setting the angle θ larger than 0.5 degree can facilitate alignment of the liquid-crystal rotation directions LCQ in which the liquid crystal molecules Lcm rotate, thereby stabilizing the behavior of the liquid crystal molecules Lcm. The shape of the comb tooth portions 131a has been exemplified as a trapezoidal shape such that the left and the right sides at least partially have obliquity opposite to each other with respect to the extending direction. The shape of the comb tooth portions 131a is not limited thereto. The obliquity of the left and the right sides of the comb tooth portions 131a with respect to the extending direction may be different between a base area closer to the base portion and a tip area away from the base portion.

Similarly, the width of the comb tooth portions 131b in the Y-direction at the protrusion start position x0 in the electrode base portion 132 is represented by w2 and is larger than the width w1 of the tip 131bf of the comb tooth portions 131b in the Y-direction. Thus, the comb tooth portions 131b have a trapezoidal shape. A long side 131b/1 and a long side 131b/2 of the comb tooth portions 131b are oblique to a reference direction of a virtual line 131bc passing through the center of the comb tooth portions 131b (X-direction in which the comb tooth portions 131b extend) by an angle θ. Setting the angle θ larger than 0.5 degree can facilitate alignment of the liquid-crystal rotation directions LCQ in which the liquid crystal molecules Lcm rotate, thereby stabilizing the behavior of the liquid crystal molecules Lcm. Because the liquid-crystal rotation directions LCQ are aligned in lines adjacent to each other in the X-direction and on the X-direction line in the liquid crystal display device 1 according to the embodiment, high orientation stability can be achieved. The shape of the comb tooth portions 131*b* has been exemplified as a trapezoidal shape such that the left and the right sides at least partially have obliquity opposite to each other with respect to the extending direction. The shape of the comb tooth portions 131*b* is not limited thereto. The obliquity of the left and the right sides of the comb tooth portions 131*b* with respect to the extending direction may be different between a base area closer to the base portion and a tip area away from the base portion.

When the comb tooth protrusion length L1 of the comb tooth portions 131*a* or the comb tooth protrusion length L2 of the comb tooth portions 131*b* is increased, it is necessary to increase the angle θ. An increase in the angle increases the difference between the width w1 and the width w2, resulting in limitation on the slit pitch p. In a case where the angle θ is 0.5 degree or greater to 1.0 degree or less, for example, the comb tooth protrusion length L1 of the comb tooth portions 131*a* or the comb tooth protrusion length L2 of the comb tooth portions 131*b* is preferably set to 45 μm or smaller.

Because the electrode base portion 132 does not contribute to transmission of light, a width D1 of the electrode base portion 132 in the X-direction (a direction orthogonal to the extending direction of the electrode base portion 132) is preferably set to a smaller value. The width D1 is preferably set larger than 0 μm and equal to or smaller than 4 μm. Setting the width D1 larger than 0 μm can increase the conductivity, whereas setting the width D1 equal to or smaller than 4 μm can suppress decrease in the transmittance. In a case where the width D1 is larger than 0 μm and equal to or smaller than 4 μm and where the comb tooth protrusion length L1 of the comb tooth portions 131*a* or the comb tooth protrusion length L2 of the comb tooth portions 131*b* is 45 μm or smaller, the display area 21 can serve as a high-definition screen of 160 pixels per inch (ppi) or higher. In a case where the width w1 is 0.5 μm, for example, the width w2 is preferably set to 1 μm or larger to ensure the quality throughout the comb tooth protrusion length L1 of the comb tooth portions 131*a* or the comb tooth protrusion length L2 of the comb tooth portions 131*b*.

As described above, setting the slit pitch p to a smaller value can increase the response speed. A decrease in the slit pitch p, however, increases the width of the comb tooth portions 131*a* or the comb tooth portions 131*b* in the Y-direction, for example, resulting in an increase in the area that does not contribute to transmission of light. The transmittance can be effectively increased by an increase in the comb tooth protrusion length L1 of the comb tooth portions 131*a* or the comb tooth protrusion length L2 of the comb tooth portions 131*b*. However, the increase in the length can possibly make alignment of the liquid-crystal rotation directions LCQ, in which the liquid crystal molecules Lcm rotate, difficult, resulting in instability in the behavior of the liquid crystal molecules Lcm.

Figure 12:
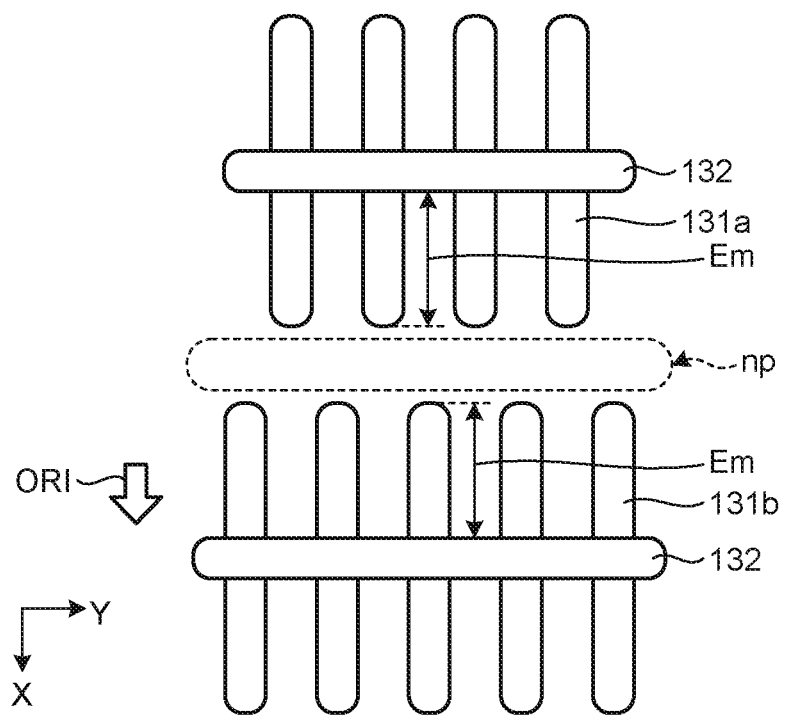
FIG. 12 is a schematic diagram for explaining in detail a transmission ineffective area according to the embodiment.
Figure 13:
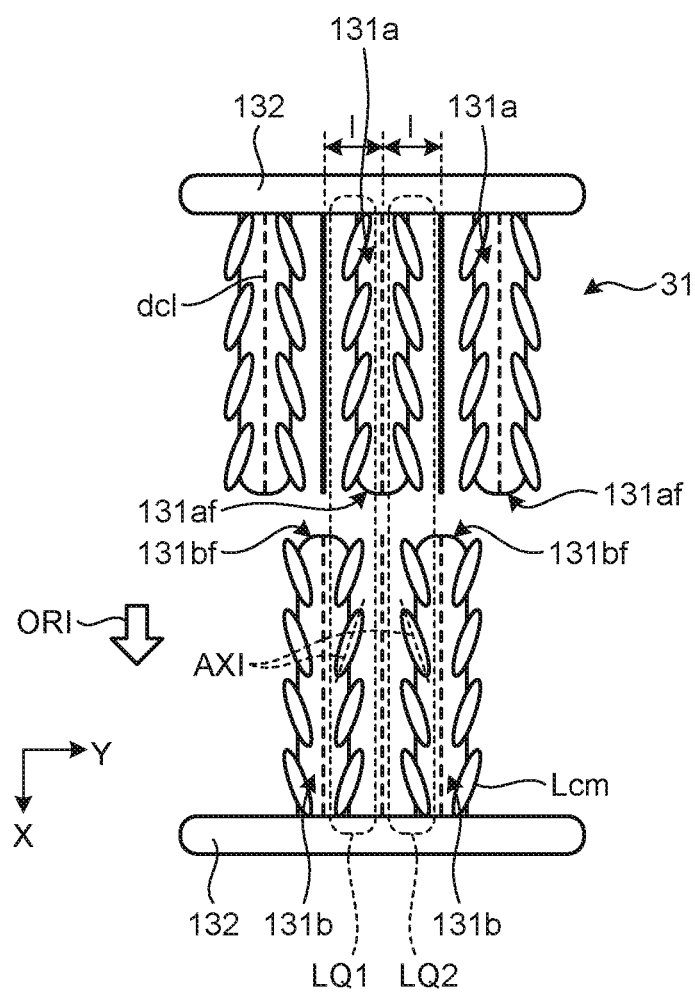
FIG. 13 is a schematic diagram illustrating a disclination line of the first electrode according to the embodiment.

FIG. 12 is a schematic diagram for explaining in detail a transmission ineffective area according to the embodiment. FIG. 13 is a schematic diagram illustrating a disclination line of the first electrode according to the embodiment. In the embodiment, a boundary between clockwise rotation and counterclockwise rotation of the liquid crystals is referred to as disclination. Due to this structure, first comb tooth portions 131*a* and second comb tooth portions 131*b* are opposed to each other with a transmission ineffective area np interposed therebetween. The transmission ineffective area np is an area which includes no translucent conductive material. Even when a voltage is applied to the first electrode 31, the liquid crystal molecules Lcm hardly move in the transmission ineffective area np. As a result, the transmittance is reduced in the transmission ineffective area np. The liquid crystals hardly move also in a region overlapping with the electrode base portion 132. Therefore, each of the comb tooth protrusion lengths L1 and L2 illustrated in FIG. 11 is a transmission effective interval Em in the X-direction in which the liquid crystal molecules Lcm effectively rotate even if a voltage is applied to the first electrode 31.

As illustrated in FIG. 13, a disclination line dcl in which the liquid crystal molecules hardly move even if a voltage is applied to the first electrode 31 is likely to be generated at the center of the first comb tooth portion 131*a*, the center of the second comb tooth portion 131*b*, the center between adjacent first comb tooth portions 131*a*, and the center between adjacent second comb tooth portions 131*b*. As illustrated in FIGS. 12 and 13, the first electrode 31 is configured such that the tip 131*af* of the first comb tooth portion 131*a* and the tip 131*bf* of the second comb tooth portion 131*b* are alternately arranged in the Y-direction. Due to this, orientations AXI of the liquid crystal molecules Lcm are the same in a line LQ1. The orientations AXI of the liquid crystal molecules Lcm are the same also in a line LQ2. As a result, the disclination line dcl generated at the center of the first comb tooth portion 131*a* and the disclination line dcl generated at the center between the adjacent second comb tooth portions 131*b* are connected to make the disclination line dcl easier to be seen. The disclination line dcl generated at the center of the second comb tooth portion 131*b* and the disclination line dcl generated at the center between the adjacent first comb tooth portions 131*a* are connected to make the disclination line dcl easier to be seen. As described above, the first electrode 31 illustrated in FIG. 13 includes many disclination lines dcl, and a period of change in transmittance in the Y-direction is shortened.

Figure 14:
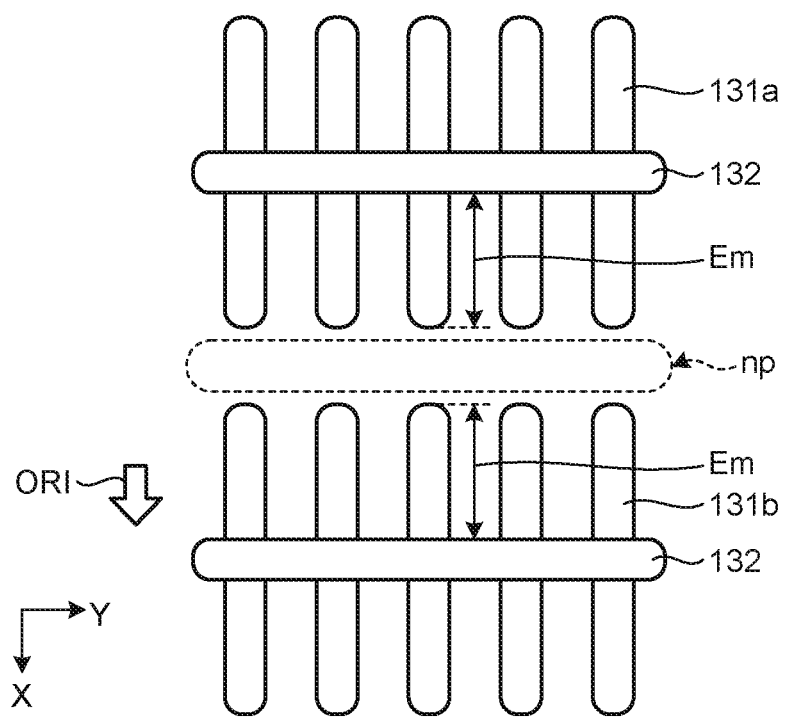
FIG. 14 is a schematic diagram for explaining in detail a transmission ineffective area according to a first modification of the embodiment.
Figure 15:
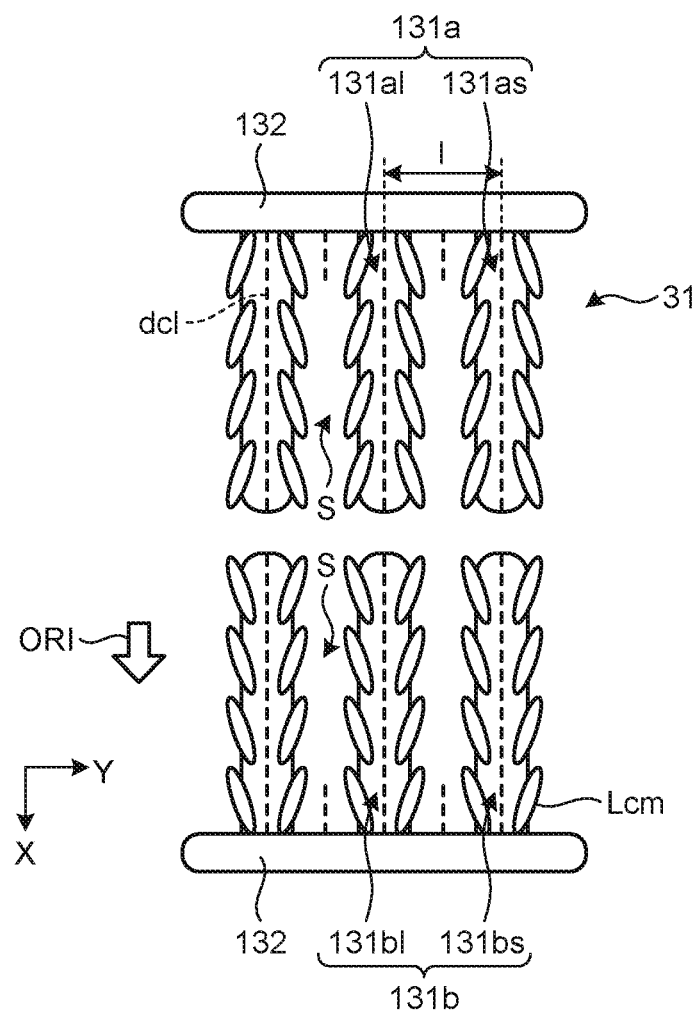
FIG. 15 is a schematic diagram illustrating a disclination line of a first electrode according to the first modification of the embodiment.

FIG. 14 is a schematic diagram for explaining in detail the transmission ineffective area according to a first modification of the embodiment. FIG. 15 is a schematic diagram illustrating the disclination line of the first electrode according to the first modification of the embodiment. As illustrated in FIGS. 14 and 15, in the first electrode 31 according to the first modification of the embodiment, a plurality of first comb tooth portions 131*al* and first comb tooth portions 131*as* alternately protrude from the electrode base portion 132 at a certain distance from each other. A plurality of second comb tooth portions 131*bl* and second comb tooth portions 131*bs* alternately protrude from the electrode base portion 132 at a certain distance from each other.

As illustrated in FIG. 15, in the area in which the first comb tooth portions 131*al* are adjacent to the first comb tooth portions 131*as* in the width direction of the slit S, the liquid crystal molecules Lcm in the neighboring areas of respective adjacent long sides are oblique to the X-direction in opposite directions. In the area in which the first comb tooth portions 131*al* are adjacent to the second comb tooth portions 131*bl* in the width direction of the slit S, the liquid crystal molecules Lcm in the neighboring areas of respective adjacent long sides are oblique to the X-direction in the same direction. In the area in which the second comb tooth portions 131*bl* are adjacent to the second comb tooth portions 131*bs* in the width direction of the slit S, the liquid crystal molecules Lcm in the neighboring areas of respective adjacent long sides are oblique to the X-direction in opposite directions. Due to this, when the neighboring areas of two right long sides arranged in a line in the X-direction and the neighboring areas of two left long sides arranged in a line in the X-direction are viewed from one of the adjacent electrode base portions 132 toward the other one thereof, the liquid crystal molecules are arranged in opposite directions, the same direction, and opposite directions, in order. The liquid crystal molecules Lcm in the respective neighboring areas of the left long side of the first comb tooth portion 131al and the left long side of the second comb tooth portion 131bl which are arranged in a line in the X-direction are oblique to the X-direction in opposite directions. The liquid crystal molecules Lcm in the respective neighboring areas of the right long side of the first comb tooth portion 131al and the right long side of the second comb tooth portion 131bl which are arranged in a line in the X-direction are oblique to the X-direction in opposite directions. The liquid crystal molecules Lcm in the respective neighboring areas of the left long side of the first comb tooth portion 131as and the left long side of the second comb tooth portion 131bs which are arranged in a line in the X-direction are oblique to the X-direction in opposite directions. The liquid crystal molecules Lcm in the respective neighboring areas of the right long side of the first comb tooth portion 131as and the right long side of the second comb tooth portion 131bs which are arranged in a line in the X-direction are oblique to the X-direction in opposite directions. Accordingly, the disclination line dcl generated at the center of the second comb tooth portion 131b and the disclination line dcl generated at the center between the adjacent first comb tooth portions 131a are separated from each other. In this way, in the first electrode 31 illustrated in FIG. 15, a decrease in transmittance of the disclination line dcl is suppressed, and a period of change in the transmittance in the Y-direction is lengthened. The liquid crystal display device 1 according to the first modification of the embodiment can thus improve the transmittance in addition to providing excellent properties such as a fast response and a wide viewing angle.

Figure 16:
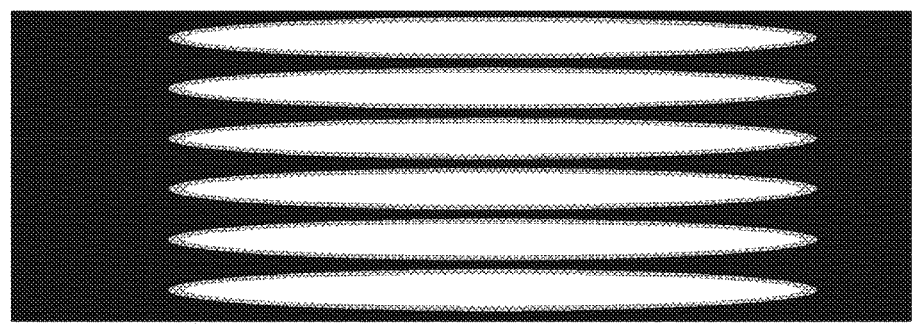
FIG. 16 is an explanatory diagram illustrating light transmittance distribution due to a disclination line of a first electrode according to a comparative example.
Figure 17:
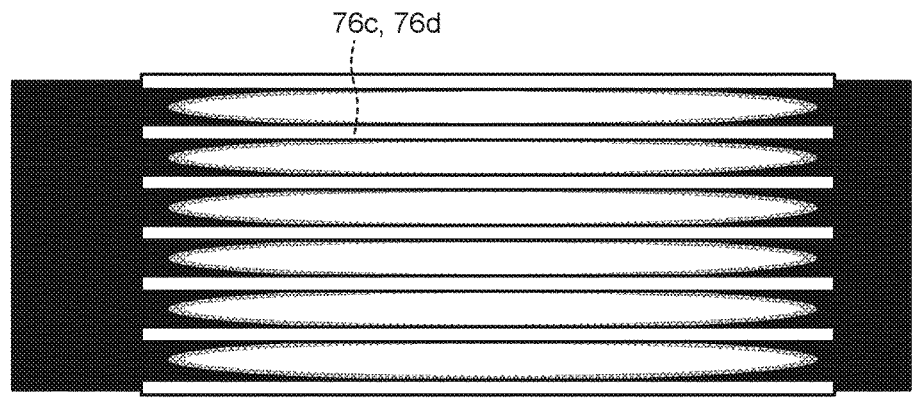
FIG. 17 is an explanatory diagram illustrating a positional relation between light transmittance distribution due to the disclination line of the first electrode according to the embodiment and a light-blocking part.

FIG. 16 is an explanatory diagram illustrating light transmittance distribution due to the disclination line of the first electrode according to a comparative example. FIG. 17 is an explanatory diagram illustrating a positional relation between the light transmittance distribution due to the disclination line of the first electrode according to the embodiment and the light-blocking part. FIGS. 16 and 17 both represent the area in which the liquid crystal molecules move when a voltage is applied to the first electrode 31 as a white area, and represents the disclination line dcl and the transmission ineffective area np as a black area. The disclination line dcl and the transmission ineffective area np have a contrast different from that of the area in which light is blocked with the black matrix 76a. For example, the white area illustrated in FIG. 16 has a contrast of 0.1:200 (black:white). The black area including the disclination line dcl and the transmission ineffective area np has a contrast of 0.1:0.1 (black:white). On the other hand, the area in which light is blocked with the black matrix 76a has a contrast of 0.001:0.001 (black:white). As a result, the contrast of the whole sub-pixels is about 1:1300 (black:white).

The liquid crystal display device 1 according to the embodiment includes, as illustrated in FIG. 4, at least one of the light-blocking part 76c and the light-blocking part 76d. As illustrated in FIG. 17, when the black area of the disclination line dcl is overlapped with at least one of the light-blocking part 76c and the light-blocking part 76d, the black area of the light-blocking area generated by at least one of the light-blocking part 76c and the light-blocking part 76d shows a contrast close to the contrast of the area in which light is blocked with the black matrix 76a. The black area of the light-blocking area generated by the light-blocking part 76c and the light-blocking part 76d has a contrast of 0.001:0.001 (black:white). As a result, the contrast of the whole sub-pixels can be made close to about 1:2000 (black:white). For example, the width of the black area of the disclination line dcl is about half or below the width of the comb tooth portion, or about half or below the width of the slit S. In addition to the light-blocking part 76c or the light-blocking part 76d illustrated in FIG. 17, another light-blocking part may overlap with the transmission ineffective area np. Another light-blocking part can intersect with the light-blocking part 76c or the light-blocking part 76d to make the black area of the light-blocking area have a grid shape.

The liquid crystal display device 1 according to the embodiment includes at least one of the light-blocking part 76c and the light-blocking part 76d illustrated in FIG. 4 for reducing intensity of light passing therethrough at a position overlapping with the center of the first comb tooth portion 131a and the center between the adjacent first comb tooth portions 131a in a direction perpendicular to the first substrate. The liquid crystal display device 1 according to the embodiment also includes at least one of the light-blocking part 76c and the light-blocking part 76d illustrated in FIG. 4 for reducing intensity of light passing therethrough at a position overlapping with the center of the second comb tooth portion 131b and the center between the adjacent second comb tooth portions 131b in a direction perpendicular to the first substrate. Accordingly, as illustrated in FIG. 17, at least one of the light-blocking part 76c and the light-blocking part 76d can overlap with the black area of the disclination line dcl. As a result, the contrast of the whole sub-pixels can be improved. As illustrated in FIG. 17, the light-blocking part 76c and the light-blocking part 76d are arranged both at the center of the first comb tooth portion 131a and at the center between the adjacent first comb tooth portions 131a. The arrangement of the light-blocking part 76c and the light-blocking part 76d is not limited thereto. The light-blocking part may be arranged at least at any of the center of the first comb tooth portion 131a and the center between the adjacent first comb tooth portions 131a. As exemplified in the arrangement of the light-blocking part 76c and the light-blocking part 76d, the light-blocking part may be formed on both of the TFT substrate 71 serving as the first substrate and the glass substrate 72 serving as the second substrate, or formed on any one of the first substrate and the second substrate.

As in the liquid crystal display device 1 according to the first modification of the embodiment, when the respective tips 131af and 131bf of the first comb tooth portion 131a and the second comb tooth portion 131b extending from the adjacent electrode base portions 132 are opposed to each other at a distance, at least one of the light-blocking part 76c and the light-blocking part 76d illustrated in FIG. 4 for reducing intensity of light passing therethrough may be provided at a position overlapping with the center of the first comb tooth portion 131a in a direction perpendicular to the first substrate. Accordingly, as illustrated in FIG. 17, at least one of the light-blocking part 76c and the light-blocking part 76d can overlap with the black area of the disclination line dcl. The number of disclination lines dcl of the first electrode 31 according to the first modification of the embodiment is smaller than that of disclination lines dcl illustrated in FIG. 13, so that transmittance can be further improved.

As illustrated in FIGS. 13 and 15, the present inventors have found that, in a case where an interval between the disclination lines dcl is l, a decrease in the interval l increases the response speed. The interval l is not necessarily a fixed interval as long as an average value of intervals l is equal to or smaller than a certain value (hereinafter, referred to as an average interval l). The average interval l may be equal to or smaller than 10 μm, for example.

Similarly, the present inventors have found that a decrease in the transmission effective interval Em also increases the response speed. The transmission effective interval Em is not necessarily a fixed interval as long as an average value of transmission effective intervals Em is equal to or smaller than a certain value (hereinafter, referred to as an average transmission effective interval Em). The average transmission effective interval Em may be equal to or smaller than 10 μm, for example.

In this way, the liquid crystal display device 1 according to the embodiment and the first modification improves the contrast of the sub-pixels Vpix while improving the response speed of the entire pixels Pix to further improve display quality in the plane.

Manufacturing Method

The method for manufacturing the liquid crystal display device 1 according to the embodiment includes the following process, for example. A manufacturing apparatus performs a first substrate preparation process to prepare a glass substrate, which is a translucent substrate, as the TFT substrate 71 of the pixel substrate (first substrate) 70A.

Subsequently, the manufacturing apparatus forms the scanning line 24$_m$ and the gate electrode 93 on the TFT substrate 71. The manufacturing apparatus then forms an insulation film 741 between the scanning line 24$_m$ and the gate electrode 93, and the semiconductor layer 92 to be formed, on the TFT substrate 71. The manufacturing apparatus then forms the layer of the source electrode 91, the drain electrode 90, and the semiconductor layer 92, for example. The manufacturing apparatus then forms an insulation film 742 between the semiconductor layer 92 and the signal line 25$_n$ to be formed. The manufacturing apparatus then forms the signal line 25$_n$ and couples the signal line 25$_n$ to the source electrode 91. The manufacturing apparatus then forms an insulation film 743 between the signal line 25$_n$ and the second electrode 32 to be formed.

Subsequently, the manufacturing apparatus forms the second electrode 32 serving as a pixel electrode by sputtering or etching, for example. The manufacturing apparatus then couples the drain electrode 90 and the second electrode 32 via the conductive contact 90H. The thickness of the second electrode 32 is 10 nm or greater to 100 nm or less, for example. The manufacturing apparatus then forms the insulation film 744 on the second electrode 32 by plasma-enhanced chemical vapor deposition (CVD), for example.

Subsequently, the manufacturing apparatus forms the first electrode 31 by sputtering or etching, for example. The manufacturing apparatus then couples the first electrode 31 to the driver IC 3 such that the first electrode 31 functions as the common electrode COM. The thickness of the first electrode 31 is 10 nm or greater to 100 nm or less, for example. The first electrode 31 is formed into a comb teeth shape with the slits S. The manufacturing apparatus then forms the first orientation film 73a, which is obtained by performing processing in the orientation direction ORI on a polymeric material such as a polyimide, on the first electrode 31. Thus, the manufacturing apparatus performs the manufacturing process of the first substrate.

The manufacturing apparatus performs a second substrate preparation process to prepare a glass substrate, which is a translucent substrate, as the glass substrate 72 of the counter substrate (second substrate) 70B.

The manufacturing apparatus forms the layer of the color filters 76R, 76G, and 76B and the black matrix 76a on the glass substrate 72 and then forms an overcoat layer and the like on the layer. The manufacturing apparatus then forms the second orientation film 73b, which is obtained by performing processing antiparallel (in an opposite direction) to the orientation direction ORI on a polymeric material such as a polyimide, on the overcoat layer. Thus, the manufacturing apparatus performs the manufacturing process of the second substrate. The color filters 76R, 76G, and 76B, and the black matrix 76a may be arranged on the TFT substrate 71 instead of the glass substrate 72. That is, the light-blocking part having a light blocking property that covers each aperture of the color filters 76R, 76G, and 76B may be formed at least on any of the glass substrate 72 (second substrate) and the TFT substrate 71 (first substrate). The light-blocking part arranged at the center of the comb tooth portion or the center between the comb tooth portions may also be formed in the same layer as the light-blocking part covering each aperture of the color filters 76R, 76G, and 76B formed on any of the glass substrate 72 (second substrate) and the TFT substrate 71 (first substrate).

The manufacturing apparatus causes the pixel substrate 70A and the counter substrate 70B to face each other. The manufacturing apparatus injects liquid crystals between the substrates and seals the liquid crystal section with a frame edge, thereby forming the liquid crystal layer 70C. The back surface of the pixel substrate 70A is provided with a polarizing plate and the backlight 6, whereas the front surface thereof is provided with a polarizing plate and the like. The driver IC 3 is coupled to an electrode terminal on the frame edge. Thus, the liquid crystal display device 1 is manufactured.

While the embodiment uses amorphous silicon (a-Si) as the semiconductor layer 92 forming the TFT element Tr, it is not limited thereto. The embodiment may use polycrystalline silicon (poly-Si) as the semiconductor layer 92. The embodiment may use another semiconductor material (for example, germanium (Ge)) instead of silicon or a material obtained by adding another material to silicon (for example, silicon germanium (SiGe)). The embodiment may use an oxide semiconductor material as the semiconductor layer 92. Examples of the oxide semiconductor material include, but are not limited to, an oxide semiconductor material including indium (In), etc.

In the embodiment, the TFT element Tr is a bottom gate TFT in which the gate electrode 93 is provided below the semiconductor layer 92. The embodiment may use a top gate TFT in which the gate electrode 93 is provided above the semiconductor layer 92 if possible. In the case of using a top gate TFT as the TFT element Tr, the manufacturing apparatus manufactures: the semiconductor layer 92, the scanning line 24$_m$ and the gate electrode 93, and the signal line 25$_n$ in this order; or the semiconductor layer 92, the signal line 25$_n$, and the scanning line 24$_m$ and the gate electrode 93 in this order, instead of the manufacturing process described above.

Figure 18:
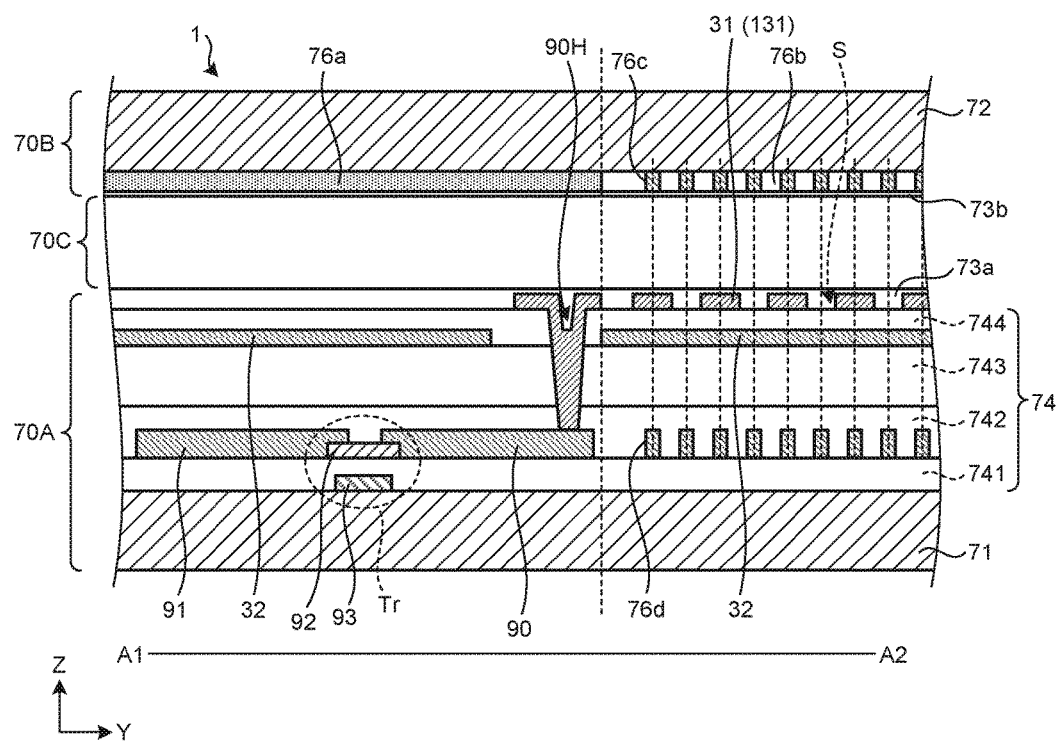
FIG. 18 is a schematic diagram illustrating a modification of the sectional view along the line A1-A2 of FIG. 3 in the liquid crystal display device according to a second modification of the embodiment.

The liquid crystal display device 1 according to a second modification of the embodiment will be described. FIG. 18 is a schematic diagram illustrating a modification of the sectional view along the line A1-A2 of FIG. 3 as the liquid crystal display device according to the second modification of the embodiment. Components identical to those described in the embodiment are denoted by like reference numerals, and overlapping explanation thereof will not be repeated.

The liquid crystal display device 1 according to the second modification of the embodiment generates an electric field (a horizontal electric field) between the first electrode 31 and the second electrode 32 laminated in a direction (Z-direction) perpendicular to the surface of the TFT substrate 71 of the pixel substrate 70A and in a direction parallel to the TFT substrate 71. As a result, liquid crystal molecules in the liquid crystal layer 70C rotate in a plane parallel to the substrate surface. The liquid crystal display device 1 uses a change in the light transmittance corresponding to the rotation of the liquid crystal molecules, thereby performing display. The second electrode 32 illustrated in FIG. 18 is the common electrode COM, whereas the first electrode 31 is the pixel electrode, for example. The first electrode 31 is coupled to the drain electrode 90 via the conductive contact 90H, for example. The first electrode 31 is sectioned by each area of the sub-pixel Vpix and has an independent pattern electrically insulated from the first electrode 31 in an area of the sub-pixel Vpix adjacent thereto. The liquid crystal display device 1 according to the embodiment exhibits the same advantage in both of the embodiment and the second modification.

Figure 19:
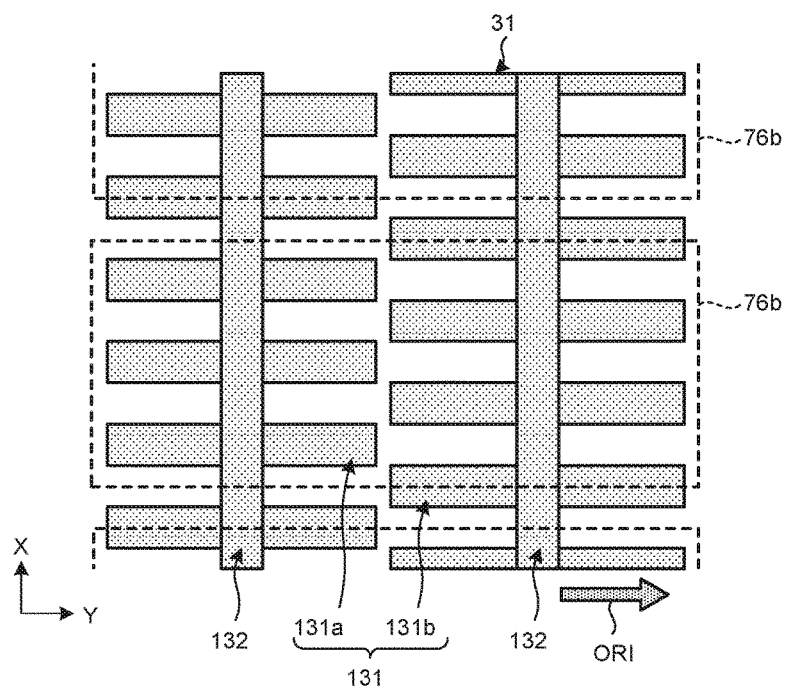
FIG. 19 is a schematic diagram for explaining a modification of a relation between the shape of the first electrode and the aperture in a liquid crystal display device according to a third modification of the embodiment.

The liquid crystal display device 1 according to a third modification of the embodiment will be described. FIG. 19 is a schematic diagram for explaining the modification of a relation between the shape of the first electrode and the aperture as the liquid crystal display device according to the third modification of the embodiment. Components identical to those described in the embodiment are denoted by like reference numerals, and overlapping explanation thereof will not be repeated.

The first electrode 31 includes the comb tooth portions 131 protruding from the electrode base portion 132 extending in the X-direction. The comb tooth portions 131 include the comb tooth portions 131a and the comb tooth portions 131b extending in opposite directions from the electrode base portion 132. Adjacent comb tooth portions 131a protrude from the electrode base portion 132 with a certain distance interposed therebetween. Similarly, adjacent comb tooth portions 131b protrude from the electrode base portion 132 with a certain distance interposed therebetween. From each electrode base portion 132, the comb tooth portions 131a extend in the Y-direction, whereas the comb tooth portions 131b extend in a direction opposite to the extending direction of the comb tooth portions 131a in the Y-direction.

The first orientation film 73a is subjected to orientation processing in the orientation direction ORI illustrated in FIG. 19 such that the liquid crystal molecules have a certain initial orientation in the Y-direction. The second orientation film 73b is subjected to orientation processing antiparallel to the orientation direction ORI of the first orientation film 73a. The orientation directions ORI of the first orientation film 73a and the second orientation film 73b are antiparallel to each other. As described above, the comb tooth portions 131a extend in the Y-direction, and the comb tooth portions 131b extend in the direction opposite to the Y-direction. The orientation direction ORI is parallel to the direction in which the comb tooth portions 131a and the comb tooth portions 131b extend. The orientation direction ORI is considered to be parallel as long as it is sufficiently parallel to maintain the rotation direction of liquid crystal molecules LCM illustrated in FIG. 9. More specifically, the orientation direction ORI allows a manufacturing error of 0 degree or greater to 0.5 degree or less. The liquid crystal display device 1 according to the embodiment exhibits the same advantage in both of the embodiment and the third modification.

Figure 20:
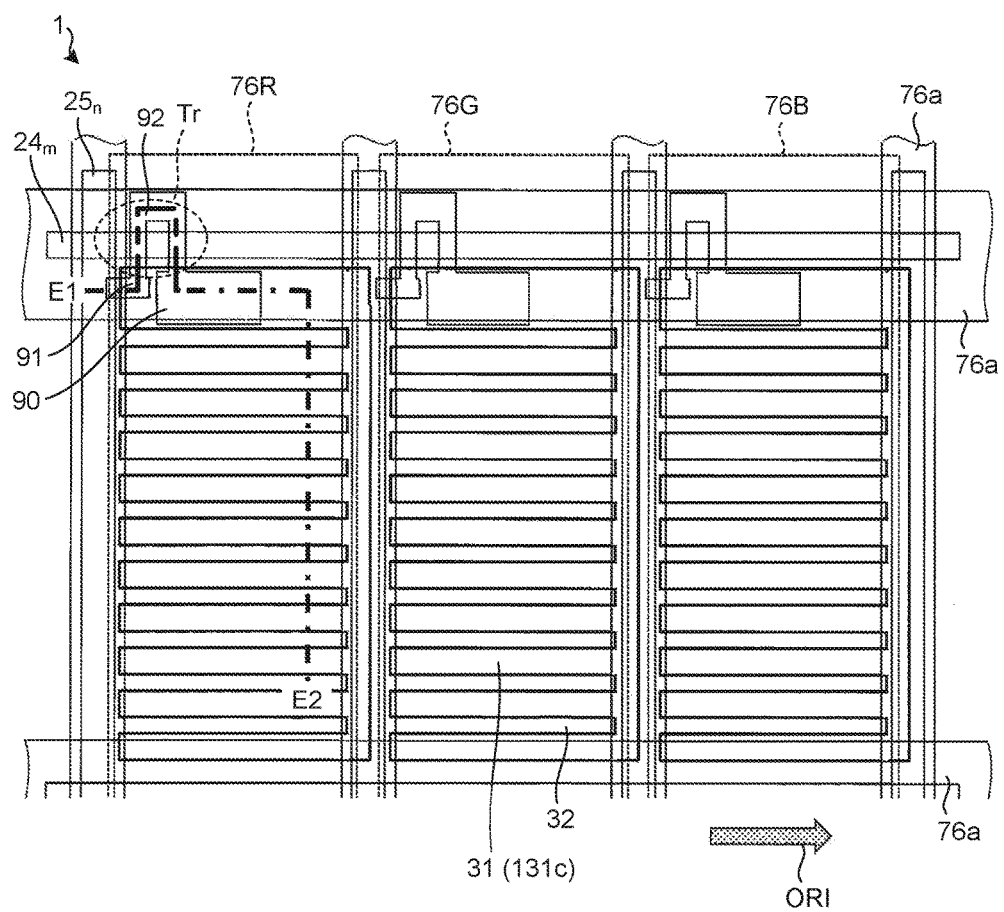
FIG. 20 is a plan view for explaining a pixel in a liquid crystal display device according to a fourth modification of the embodiment.
Figure 21:
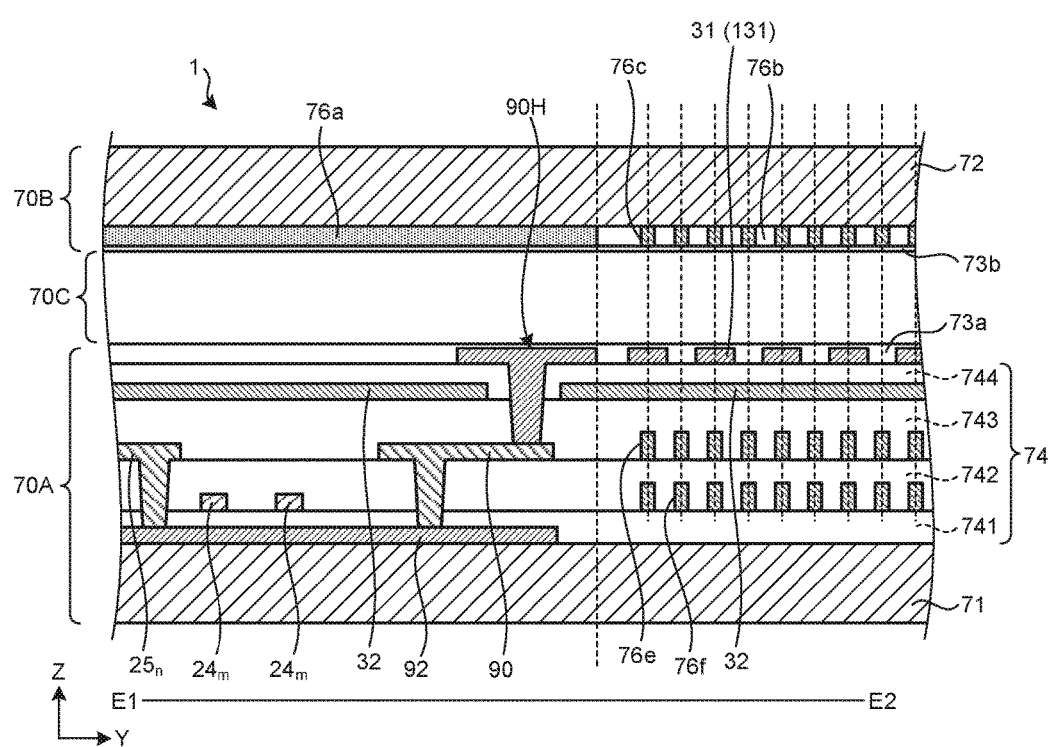
FIG. 21 is a schematic diagram illustrating a sectional view along the line E1-E2 of FIG. 20.

The liquid crystal display device 1 according to a fourth modification of the embodiment will be described. FIG. 20 is a plan view for explaining the pixel as the liquid crystal display device according to the fourth modification of the embodiment. FIG. 21 is a schematic diagram illustrating a sectional view along the line E1-E2 of FIG. 20. Components identical to those described in the embodiment are denoted by like reference numerals, and overlapping explanation thereof will not be repeated.

As illustrated in FIG. 20, the semiconductor layer 92 is polycrystalline silicon (poly-Si) forming the TFT element Tr. The semiconductor layer 92 is a double-gate transistor forming a channel with two areas.

As illustrated in FIGS. 20 and 21, the liquid crystal display device 1 according to the fourth modification of the embodiment generates an electric field (a horizontal electric field) between the first electrode 31 and the second electrode 32 laminated in a direction (Z-direction) perpendicular to the surface of the TFT substrate 71 of the pixel substrate 70A in a direction parallel to the TFT substrate 71. As a result, liquid crystal molecules in the liquid crystal layer 70C rotate in a plane parallel to the substrate surface. The liquid crystal display device 1 uses a change in the light transmittance corresponding to the rotation of the liquid crystal molecules, thereby performing display. The second electrode 32 illustrated in FIG. 21 is the common electrode COM, whereas the first electrode 31 is the pixel electrode, for example. The first electrode 31 is coupled to the conductive drain electrode 90, for example. The first electrode 31 is sectioned by each area of the sub-pixel Vpix and has an independent pattern electrically insulated from the first electrode 31 in an area of the sub-pixel Vpix adjacent thereto.

The first orientation film 73a is subjected to orientation processing in the orientation direction ORI such that the liquid crystal molecules have a certain initial orientation in the X-direction. The second orientation film 73b is subjected to orientation processing antiparallel to the orientation direction ORI of the first orientation film 73a. The orientation directions of the first orientation film 73a and the second orientation film 73b are antiparallel to each other.

Similarly to the liquid crystal display device 1 according to the embodiment, in the liquid crystal layer 70C of the liquid crystal display device 1 according to the fourth modification of the embodiment, applying a voltage to the first electrode 31 and the second electrode 32 rotates the liquid crystal molecules in the neighboring area of the right long side 131R and those in the neighboring area of the left long side 131L in opposite directions. The right long side 131R is one of the sides of adjacent comb tooth portions 131c facing each other in the width direction of the slit S, whereas the left long side 131L is the other of the sides. Thus, the liquid crystal molecules respond to a change in the electric field between the first electrode 31 and the second electrode 32 at higher speed in the liquid crystal display device 1 according to the fourth modification of the embodiment than in the FFS-mode liquid crystal display device disclosed in JP-A-2008-52161. As a result, the liquid crystal display device 1 according to the fourth modification of the embodiment achieves a higher response speed.

Similarly to the comb tooth protrusion length L2 of the comb tooth portions 131b, in a case where a comb tooth protrusion length of the comb tooth portions 131c increases, it is necessary to increase the angle $\theta$. An increase in the angle increases the difference between the width w1 and the width w2, resulting in limitation on the slit pitch p. In a case where the angle $\theta$ is 0.5 degree or greater to 1.0 degree or less, for example, the comb tooth protrusion length of the comb tooth portions 131c is preferably set to 45 μm or smaller.

Because the electrode base portion 132 does not contribute to transmission of light, the width D1 of the electrode base portion 132 in the X-direction (direction orthogonal to the extending direction of the electrode base portion 132) is preferably set to a smaller value. The width D1 is preferably set to a value larger than 0 µm and equal to or smaller than 4 µm. Setting the width D1 larger than 0 µm can increase the conductivity, whereas setting the width D1 equal to or smaller than 4 µm can suppress a decrease in the transmittance. In a case where the width D1 is larger than 0 µm and equal to or smaller than 4 µm and where the comb tooth protrusion length of the comb tooth portions 131c is 45 µm or smaller, the display area 21 can serve as a high-definition screen of 160 ppi or higher. In a case where the width w1 is 0.5 µm, for example, the width w2 is preferably set to 1 µm or larger to ensure the quality throughout the comb tooth protrusion length of the comb tooth portions 131c.

In the liquid crystal display device 1 according to the fourth modification of the embodiment, the aperture 76b also includes the light-blocking part 76e having a light blocking property in the same layer as the source electrode 91 or the drain electrode 90. A light-blocking part 76e is provided to the pixel substrate 70A. A material of the light-blocking part 76e is the same as that of the source electrode 91 or the signal line $25_n$ that is wiring for causing the first electrode 31 or the second electrode 32 to work. A light-blocking part 76f is provided to the pixel substrate 70A. A material of the light-blocking part 76f is the same as that of the scanning line $24_m$ that is wiring for causing the first electrode 31 or the second electrode 32 to work. Due to this, a forming pattern of the light-blocking part 76e or the light-blocking part 76f has high accuracy, and does not require additional processes. A position of the light-blocking part 76c corresponds to the disclination line dcl described above. The liquid crystal display device 1 according to the fourth modification of the embodiment includes at least one of the light-blocking part 76c, the light-blocking part 76e, and the light-blocking part 76f for reducing intensity of light passing therethrough at a position overlapping with the center of the first comb tooth portion 131c and the center between the adjacent first comb tooth portions 131c in a direction perpendicular to the first substrate. As a result, the contrast of the whole sub-pixels can be improved. It is sufficient that the liquid crystal display device 1 according to the embodiment includes at least one of the light-blocking part 76c, the light-blocking part 76e, and the light-blocking part 76f illustrated in FIG. 21. As illustrated in FIG. 21, the light-blocking part 76e and the light-blocking part 76f are arranged both at the center of the first comb tooth portion 131c and at the center between the adjacent first comb tooth portions 131c. The arrangement of the light-blocking part 76e and the light-blocking part 76f is not limited thereto. The light-blocking part may be arranged at least at any of the center of the first comb tooth portion 131c and the center between the adjacent first comb tooth portions 131c. As exemplified in the arrangement of the light-blocking part 76e and the light-blocking part 76f, the light-blocking part may be formed on both of the TFT substrate 71 serving as the first substrate and the glass substrate 72 serving as the second substrate, or formed on any one of the first substrate and the second substrate.

As described above, setting the slit pitch p to a smaller value can increase the response speed. A decrease in the slit pitch p, however, increases the width of the comb tooth portions 131c in the Y-direction, for example, resulting in an increase in the area that does not contribute to transmission of light. Even when the liquid crystal display device 1 according to the fourth modification of the embodiment has an aspect of the fourth modification, the device exhibits the same advantage as that of the embodiment.

Evaluation Example

Figure 22:
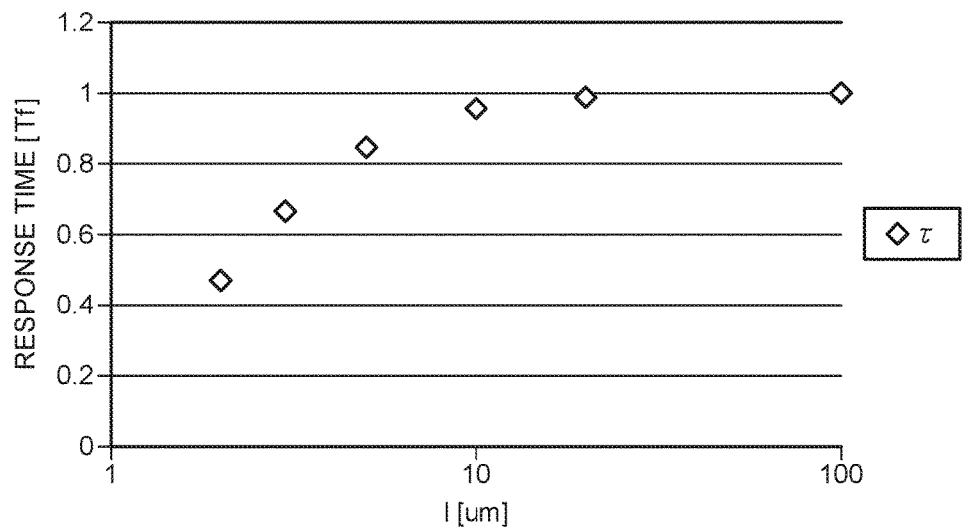
FIG. 22 is an explanatory diagram for explaining a relation between a response speed of a pixel and an average interval between disclination lines in a first evaluation example of the liquid crystal display unit according to the embodiment.

The following describes evaluation results of a first evaluation example to a third evaluation example. The present invention is not limited to these evaluation examples. FIG. 22 is an explanatory diagram for explaining a relation between the response speed of the pixel and an average interval between the disclination lines in a first evaluation example of the liquid crystal display unit according to the embodiment. In a case where a reference response time Tf is 1 assuming that the average interval l between adjacent disclination lines dcl is infinity and voltage is off under the same conditions of an aperture width and a cell thickness d of the sub-pixels Vpix in the first evaluation example, simulated are relative values of a response time τ when voltage is off with respect to the reference response time when the average interval l is each of 2 µm, 3 µm, 5 µm, 10 µm, 20 µm, and 100 µm. FIG. 22 illustrates a simulation result. As illustrated in FIG. 22, when the average interval l is equal to or smaller than 10 µm, the liquid crystal display device 1 can accelerate the response time t when voltage is off. As a result, the liquid crystal display device 1 can accelerate the response speed of the liquid crystals.

Figure 23:
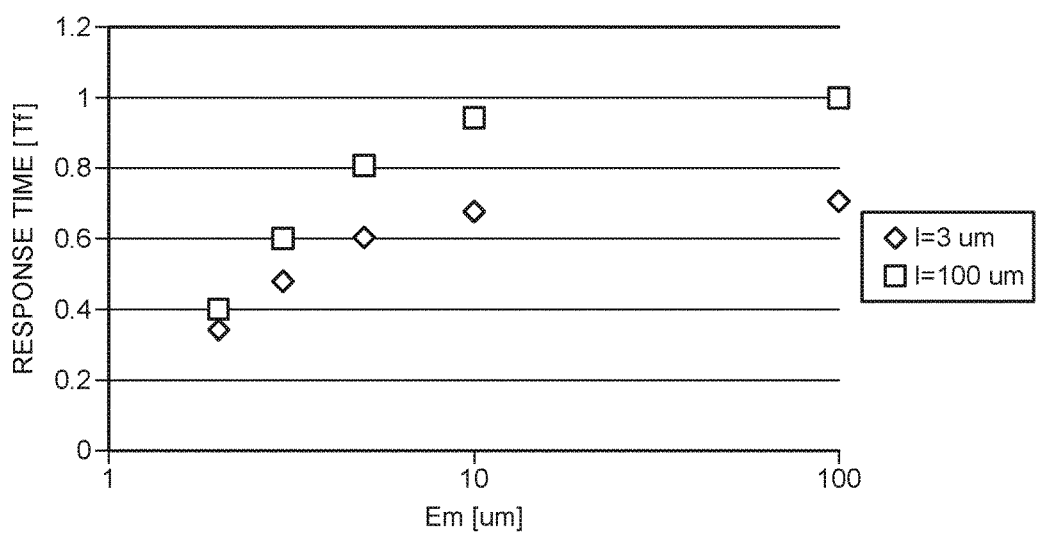
FIG. 23 is an explanatory diagram for explaining a relation between a response speed of a pixel and an average transmission effective interval in a second evaluation example of the liquid crystal display unit according to the embodiment.

FIG. 23 is an explanatory diagram for explaining a relation between the response speed of the pixel and the average transmission effective interval in a second evaluation example of the liquid crystal display unit according to the embodiment. In a case where the reference response time Tf is 1 assuming that the average transmission effective interval Em is infinity and voltage is off, simulated are the relative values of the response time when voltage is off with respect to the average interval reference response time while changing the average transmission effective interval Em for respective cases where the average interval l is each of 3 µm and 100 µm. FIG. 23 illustrates a simulation result. As illustrated in FIG. 23, when the average transmission effective interval Em is equal to or smaller than 10 µm, the liquid crystal display device 1 can accelerate the response time when voltage is off.

Application Examples

Figure 24:
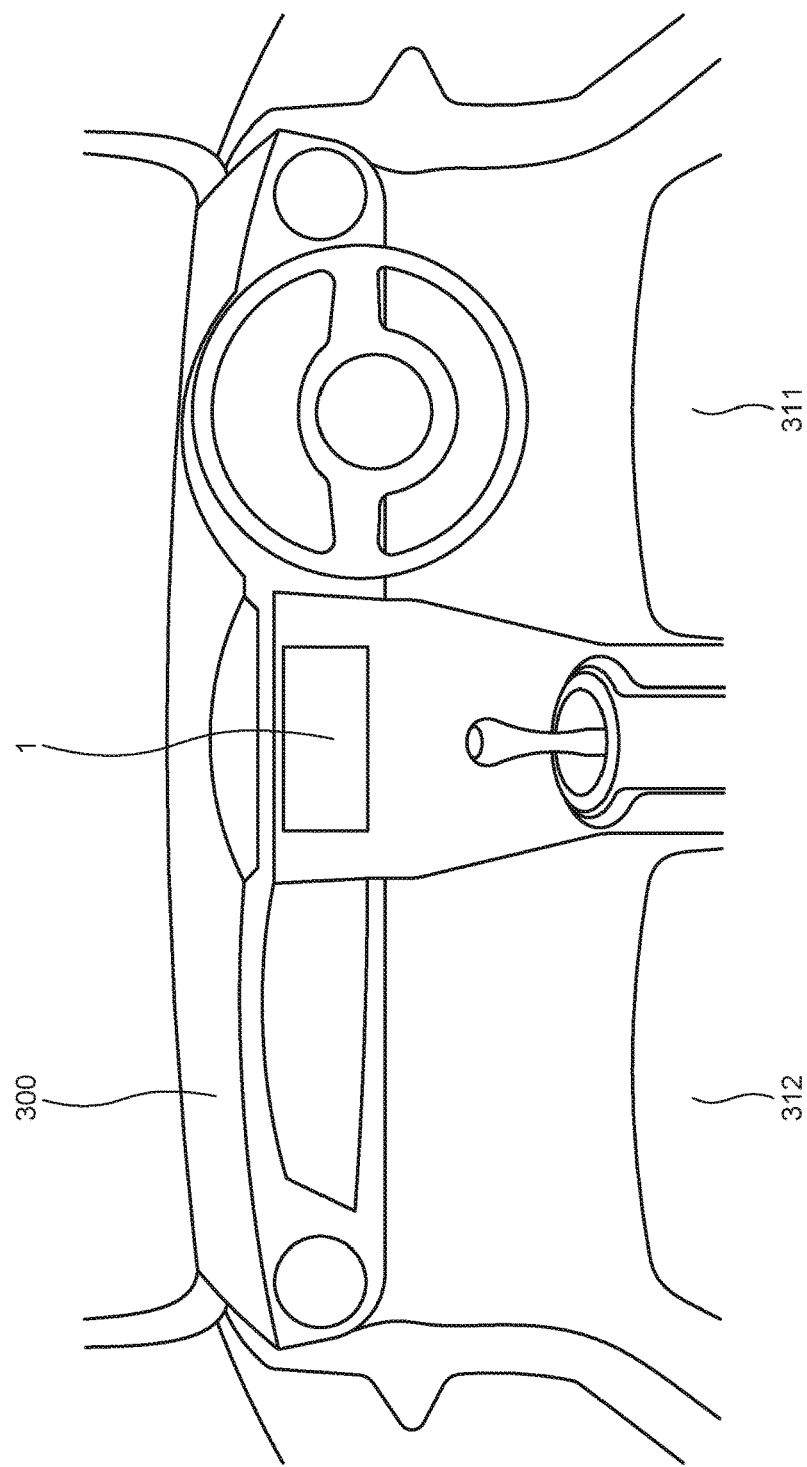
FIG. 24 is a diagram illustrating an example of an electronic apparatus to which the liquid crystal display device according to the embodiment is applied.
Figure 25:
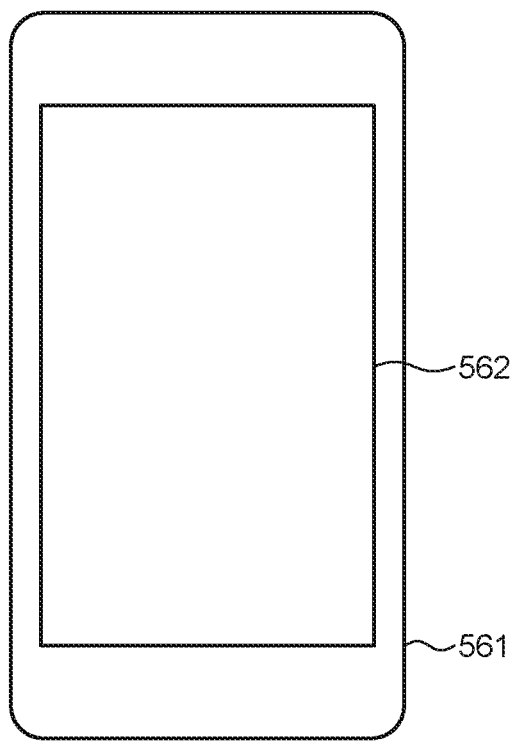
FIG. 25 is a diagram illustrating an example of the electronic apparatus to which the liquid crystal display device according to the embodiment is applied.

The following describes application examples of the liquid crystal display device 1 explained in the embodiment and the modifications thereof with reference to FIGS. 24 and 25. FIGS. 24 and 25 are diagrams illustrating an example of an electronic apparatus to which the liquid crystal display device according to the embodiment is applied. The liquid crystal display device 1 according to the embodiment is applicable to electronic apparatuses of all fields, such as car navigation systems as illustrated in FIG. 24, television apparatuses, digital cameras, notebook personal computers, portable electronic apparatuses including mobile phones as illustrated in FIG. 25, or video cameras. In other words, the liquid crystal display device 1 according to the embodiment is applicable to electronic apparatuses of all fields that display video signals received from the outside or video signals generated inside thereof as an image or video. The electronic apparatus includes a control device 4 (refer to FIG. 1) that supplies video signals to the liquid crystal display device and controls the operation of the liquid crystal display device.

An electronic apparatus illustrated in FIG. 24 is a car navigation device to which the liquid crystal display device 1 according to the embodiment and the modifications thereof is applied. The liquid crystal display device 1 is arranged on a dashboard 300 inside an automobile. Specifically, the liquid crystal display device 1 is arranged on the dashboard 300 and between a driver seat 311 and a passenger seat 312. The liquid crystal display device 1 of the car navigation device is utilized to display navigation, display a music operation screen, reproduce and display a movie, or the like.

An electronic apparatus illustrated in FIG. 25 operates as a mobile computer, a multifunctional mobile phone, a mobile computer capable of making a voice call, or a mobile computer capable of performing communications to which the liquid crystal display device 1 according to the embodiment and the modifications thereof is applied. The electronic apparatus is a portable information terminal, which may be called a smartphone or a tablet terminal. The portable information terminal includes a display unit 562 on the surface of a housing 561, for example. The display unit 562 includes the liquid crystal display device 1 according to the embodiment and the modifications thereof and a touch detecting function (what is called a touch panel) that can detect external proximity objects.

The embodiment is not limited to the above description. The components of the above embodiment encompass a component easily conceivable by those skilled in the art, substantially the same component, and what is called an equivalent. The components can be variously omitted, replaced, and modified without departing from the gist of the embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
a first substrate;
a second substrate arranged to be opposed to the first substrate;
a liquid crystal layer arranged between the first substrate and the second substrate;
a first electrode arranged between the first substrate and the liquid crystal layer; and
a second electrode arranged at a position opposed to the first electrode, wherein
the first electrode comprises:
a plurality of electrode base portions extending in a first direction;
a plurality of first comb tooth portions protruding from each of the electrode base portions in a comb teeth shape with a certain distance interposed therebetween in the first direction and extending in a second direction different from the first direction; and
a plurality of second comb tooth portions protruding from each of the electrode base portions in a comb teeth shape with a certain distance interposed therebetween in the first direction and extending in a direction opposite to the second direction,
tips of the first comb tooth portions and tips of the second comb tooth portions extending from the adjacent electrode base portions are opposed to each other with a gap therebetween,
left and right sides of each of the first and second comb tooth portions facing each other in the second direction are oblique in a line symmetrical manner,
the left and right sides of each of the first and second comb tooth portions protruding from an identical electrode base portion of the electrode base portions are line symmetric about the identical electrode base portion,
at least one of the first substrate and the second substrate includes a plurality of light-blocking parts at a position each overlapping with a disclination line that is a boundary between clockwise rotation and counter-clockwise rotation of liquid crystal molecules in the liquid crystal layer, and in which the liquid crystal molecules hardly move when a voltage is applied to the first electrode, the disclination line being generated at, at least one of a center axis of each of the comb tooth portions and a center between the adjacent comb tooth portions in a direction perpendicular to the first substrate, and
an average interval between the light-blocking parts is equal to or smaller than 10 μm.

2. The liquid crystal display device according to claim 1, wherein
a plurality of pixels each including a plurality of sub-pixels are arranged in a matrix, and
each of the light-blocking parts is arranged in the same layer as a second light-blocking part having a light blocking property that surrounds an aperture of the sub-pixels.

3. The liquid crystal display device according to claim 1, wherein
a plurality of pixels each including a plurality of sub-pixels are arranged in a matrix, and
each of the light-blocking parts is arranged in the same layer as a second light-blocking part having a light blocking property that is arranged to be opposed to a signal line or a scanning line.

4. The liquid crystal display device according to claim 1, wherein, in a case where each of the light-blocking parts is arranged at a position overlapping with the center between the adjacent comb tooth portions, a width of each of the light-blocking parts is half or less a width between the adjacent comb tooth portions.

5. The liquid crystal display device according to claim 1, wherein, in a case where each of the light-blocking parts is arranged at a position overlapping with the center axis of each of the comb tooth portions, a width of each of the light-blocking parts is half or less a width of each of the comb tooth portions.

6. The liquid crystal display device according to claim 1, wherein the light-blocking parts are provided on a first substrate side.

7. The liquid crystal display device according to claim 1, wherein the light-blocking parts are provided on a second substrate side.

8. The liquid crystal display device according to claim 1, further comprising:
a first orientation film and a second orientation film, wherein
one of the first orientation film and the second orientation film is subjected to orientation processing in a direction substantially parallel to an extending direction of the comb tooth portions.

9. A liquid crystal display device comprising:
a first substrate;
a second substrate arranged to be opposed to the first substrate;
a liquid crystal layer arranged between the first substrate and the second substrate;
a first electrode arranged between the first substrate and the liquid crystal layer; and a second electrode arranged at a position opposed to the first electrode, wherein
the first electrode comprises:
a plurality of electrode base portions extending in a first direction;
  a plurality of first comb tooth portions protruding from each of the electrode base portions in a comb teeth shape with a certain distance interposed therebetween in the first direction and extending in a second direction different from the first direction; and
  a plurality of second comb tooth portions protruding from each of the electrode base portions in a comb teeth shape with a certain distance interposed therebetween in the first direction and extending in a direction opposite to the second direction,
tips of the first comb tooth portions and tips of the second comb tooth portions extending from the adjacent electrode base portions are opposed to each other with a gap therebetween,
left and right sides of each of the first and second comb tooth portions facing each other in the second direction are oblique in a line symmetrical manner,
the left and right sides of each of the first and second comb tooth portions protruding from an identical electrode base portion of the electrode base portions are line symmetric about the identical electrode base portion,
at least one of the first substrate and the second substrate includes a light-blocking part at a position overlapping with a disclination line that is a boundary between clockwise rotation and counterclockwise rotation of liquid crystal molecules in the liquid crystal layer, and in which the liquid crystal molecules hardly move when a voltage is applied to the first electrode, the disclination line being generated at at least one of a center axis of each of the comb tooth portions and a center between the adjacent comb tooth portions in a direction perpendicular to the first substrate,
a plurality of pixels each including a plurality of sub-pixels are arranged in a matrix, and
the light-blocking part is provided to the first substrate, and a material of the light-blocking part is the same as that of a signal line or a scanning line.

10. The liquid crystal display device according to claim 9, wherein
the light-blocking part is arranged in the same layer as a second light-blocking part having a light blocking property that surrounds an aperture of the sub-pixels.

11. The liquid crystal display device according to claim 9, wherein
the light-blocking part is arranged in the same layer as a second light-blocking part having a light blocking property that is arranged to be opposed to a signal line or a scanning line.

12. The liquid crystal display device according to claim 9, wherein, in a case where the light-blocking part is arranged at a position overlapping with the center between the adjacent comb tooth portions, a width of the light-blocking part is half or less a width between the adjacent comb tooth portions.

13. The liquid crystal display device according to claim 9, wherein, in a case where the light-blocking part is arranged at a position overlapping with the center axis of each of the comb tooth portions, a width of the light-blocking part is half or less a width of each of the comb tooth portions.

14. The liquid crystal display device according to claim 9, wherein the light-blocking part is formed on a first substrate side.

15. The liquid crystal display device according to claim 9, wherein the light-blocking part is formed on a second substrate side.

16. The liquid crystal display device according to claim 9, further comprising:
a first orientation film and a second orientation film, wherein
one of the first orientation film and the second orientation film is subjected to orientation processing in a direction substantially parallel to an extending direction of the comb tooth portions.

* * * * *